United States Patent
Szczerba et al.

(10) Patent No.: US 12,437,642 B1
(45) Date of Patent: Oct. 7, 2025

(54) PARKING ASSIST IN DUAL HEAD-UP DISPLAY SYSTEM

(71) Applicant: GM Global Technology Operations LLC, Detroit, MI (US)

(72) Inventors: Joseph F. Szczerba, Grand Blanc, MI (US); Thomas A. Seder, Fraser, MI (US); Kai-Han Chang, Madison Heights, MI (US); Guy N. Kennerly, Southfield, MI (US); Alexander Matthews, Detroit, MI (US); Robert C. Jablonski, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 18/625,708

(22) Filed: Apr. 3, 2024

(51) Int. Cl.
| | |
|---|---|
| G08G 1/14 | (2006.01) |
| B62D 15/02 | (2006.01) |
| G02B 27/01 | (2006.01) |
| G06F 3/01 | (2006.01) |
| G06T 19/00 | (2011.01) |
| G06V 20/56 | (2022.01) |

(52) U.S. Cl.
CPC .......... *G08G 1/143* (2013.01); *B62D 15/027* (2013.01); *G02B 27/01* (2013.01); *G06F 3/013* (2013.01); *G06T 19/006* (2013.01); *G06V 20/56* (2022.01); *B60W 2556/45* (2020.02)

(58) Field of Classification Search
CPC .............................. B62D 15/027; G02B 27/01
See application file for complete search history.

(56) References Cited

U.S. PATENT DOCUMENTS

| | | | |
|---|---|---|---|
| 2016/0284217 A1* | 9/2016 | Lee | B60K 31/0008 |
| 2018/0372923 A1* | 12/2018 | Wijaya | G02B 3/005 |
| 2020/0062242 A1* | 2/2020 | Hayakawa | B62D 15/0285 |
| 2024/0246529 A1 | 7/2024 | Wang et al. | |

FOREIGN PATENT DOCUMENTS

| | | |
|---|---|---|
| CN | 116168554 A | 5/2023 |
| DE | 102022127434 A1 | 10/2023 |
| DE | 102022133880 A1 | 6/2024 |

* cited by examiner

*Primary Examiner* — Thomas S Mccormack
(74) *Attorney, Agent, or Firm* — Vivacqua Crane, PLLC

(57) ABSTRACT

A dual head-up display (HUD) system includes a plurality of on-board sensors, a wireless communication module, a driver monitoring system, and a system controller in electronic communication with the plurality of on-board sensors, the driver monitoring system and the wireless communication module, and adapted to identify parking spaces within proximity to the vehicle, display, with an augmented reality HUD, first information related to identified parking spaces, display, with a reflective HUD, second information related to the identified parking spaces, determine, if the vehicle is performing a parking maneuver, and when the vehicle is performing a parking maneuver into a selected parking space, to display, with the augmented reality HUD, first and second parking assist graphics adapted to provide guidance to a driver of the vehicle while parking the vehicle in the selected parking space.

20 Claims, 6 Drawing Sheets

PARKING ASSIST IN DUAL HEAD-UP DISPLAY SYSTEM

INTRODUCTION

The present disclosure relates to a dual head-up display (HUD) system for providing parking identification and parking assistance to a driver of a vehicle with both an augmented reality HUD and a reflective HUD.

A head-up display (HUD) has become common in modern automobiles. HUDs project useful information like speed and navigation information into the driver's field of view. This avoids forcing the driver to look down, away from the road, to read gages on the dash of the automobile. This reduces driver distractions and keeps the driver's eyes on the road.

While current head-up displays achieve their intended purpose, there is a need for a new and improved system and method of providing parking assist graphics to a driver of a vehicle using a dual HUD system.

SUMMARY

According to several aspects of the present disclosure, a method of providing parking assistance to a driver of a vehicle with a dual head-up display (HUD) system includes detecting, with a plurality of on-board sensors, vehicle driving characteristics, receiving, with a wireless communication module, information from external sources, tracking, with a driver monitoring system, a position of the driver's eyes, identifying, with a system controller in electronic communication with the plurality of on-board sensors and the wireless communication module, parking spaces within proximity to the vehicle, displaying, with an augmented reality HUD, first information related to identified parking spaces in proximity to the vehicle, and displaying, with a reflective HUD, second information related to the identified parking spaces in proximity to the vehicle.

According to several aspects of the present disclosure, a dual head-up display (HUD) system includes a plurality of on-board sensors adapted to detect and monitor vehicle driving characteristics, a wireless communication module adapted to receive information from external sources, a driver monitoring system adapted to track a position of a driver's eyes, a system controller in electronic communication with the plurality of on-board sensors, the driver monitoring system and the wireless communication module, and adapted to identify parking spaces within proximity to the vehicle, display, with an augmented reality HUD, first information related to identified parking spaces in proximity to the vehicle, display, with a reflective HUD, second information related to the identified parking spaces in proximity to the vehicle, determine if an emergency vehicle is approaching the vehicle, based on data from the plurality of on-board sensors and data received by the wireless communication module, and when an emergency vehicle is approaching the vehicle, display, with the augmented reality HUD, first information including graphics adapted to alert a driver of the vehicle that the emergency vehicle is approaching and to direct the driver to a parking space to allow the emergency vehicle to pass, and display, with the reflective HUD, second information including graphics adapted alert a driver of the vehicle that the emergency vehicle is approaching and to direct the driver to a parking space to allow the emergency vehicle to pass, and determine, if the vehicle is performing a parking maneuver, based on data from the plurality of on-board sensors and data received by the wireless communication module, and, when the vehicle is performing a parking maneuver into a selected one of the identified parking spaces, display, with the augmented reality HUD, a first parking assist graphic adapted to provide guidance to a driver of the vehicle while parking the vehicle in the selected parking space, and display, with the reflective HUD, a second parking assist graphic adapted to provide guidance to the driver of the vehicle while parking the vehicle in the selected parking space.

According to another aspect, the system controller is further adapted to capture, with at least one image capturing device in electronic communication with the system controller, images of an environment surrounding the vehicle, detect, with at least one non-visual sensor in electronic communication with the system controller, objects within the environment surrounding the vehicle, identify location markers for the identified parking spaces and objects within the environment surrounding the vehicle adjacent to the identified parking spaces, and determine a position of the vehicle relative to the identified location markers for the identified parking spaces and objects within the environment surrounding the vehicle adjacent to the identified parking spaces.

According to another aspect, the vehicle windshield includes a first portion that is substantially clear, and the augmented reality HUD is adapted to project, with a light source of a projection module the first information upward to the first portion of the windshield, wherein the first information is reflected to the eyes of the driver of the vehicle and the driver of the vehicle perceives the first information within a far image plane overlayed onto the identified parking spaces, and project, with the light source of the projection module the first parking assist graphic upward to the first portion of the windshield, wherein the first parking assist graphic is reflected to the eyes of the driver of the vehicle and the driver of the vehicle perceives the first parking assist graphic within the far image plane overlayed onto the selected parking space.

According to another aspect, when displaying, with the augmented reality HUD, the first information related to identified parking spaces in proximity to the vehicle, the system controller is further adapted to calculate a first location within the first portion of the windshield based on data received from the driver monitoring system, the at least one image capturing device and the at least on non-visual sensor, and project the first information upward to the first location, wherein the first information is perceived by the driver properly positioned relative to the identified parking spaces, continuously, on a periodic cycle, re-calculate the first location based on data received from the driver monitoring system, the at least one image capturing device and the at least on non-visual sensor as a position of the head an eyes of the driver move and as the position of the vehicle relative to the identified parking spaces changes, and when displaying, with the augmented reality HUD, the first parking assist graphic adapted to provide guidance to the driver of the vehicle while parking the vehicle in the selected parking space, the system controller is further adapted to calculate a second location within the first portion of the windshield based on data received from the driver monitoring system, the at least one image capturing device and the at least one non-visual sensor, project the first parking assist graphic upward to the second location, wherein the first parking assist graphic is perceived by the driver properly positioned relative to the selected parking space, location markers for the selected parking space and objects within the environment surrounding the vehicle adjacent to the selected parking space, and continuously, on a periodic cycle, recalculate the second location based on data received from the driver monitoring system, the at least one image capturing device and the at least on non-visual sensor as the position of the head an eyes of the driver move and as the position of the vehicle relative to the selected parking space changes throughout the parking maneuver.

According to another aspect, the vehicle windshield includes a second portion that is substantially opaque, and the reflective HUD is adapted to project, with a light source of a projection module of the reflective HUD, the second information upward to the second portion of the windshield, wherein the second information is reflected to the eyes of the driver of the vehicle and the driver of the vehicle perceives the second information displayed on the second portion of the windshield within a near image plane, and project, with the light source of the projection module of the reflective HUD, the second parking assist graphic upward to the second portion of the windshield, wherein the second parking assist graphic is reflected to the eyes of the driver of the vehicle and the driver of the vehicle perceives the second parking assist graphic displayed on the second portion of the windshield within the near image plane.

According to another aspect, the system controller is further adapted to probabilistically calculate, using a machine learning algorithm, a probability that the driver will park within each identified parking space, determine the first information and the second information based on the calculated probabilities, probabilistically calculate, using the machine learning algorithm, a preferred location within the selected parking space, and determine the first parking assist graphic and the second parking assist graphic based on the preferred location.

According to another aspect, when identifying parking spaces within proximity to the vehicle, the system controller is further adapted to collect data, via the wireless communication module, related to availability, fees, use/timing restrictions, permit requirements and remaining pre-paid time for identified parking spaces and include such data in the first and second information, determine, with computer vision analysis techniques, data related to dimensional characteristics of identified parking spaces and use such data to formulate the first and second information based on dimensional characteristics of the vehicle, probabilistically calculate, using a machine learning algorithm, probability-based data related to availability, fees, use/timing restrictions, permit requirements, remaining pre-paid time and dimensional characteristics for identified parking spaces, and determine the first information and the second information based on the calculated probability-based data.

According to another aspect, the system controller is further adapted to continuously identify location markers and objects within the environment surrounding the vehicle adjacent to the selected parking space, determine the position of the vehicle relative to the identified location markers and objects within the environment surrounding the vehicle adjacent to the selected parking space, and update the displayed first parking assist graphic and the displayed second parking assist graphic as the position of the vehicle relative to the identified location markers and objects within the environment surrounding the vehicle adjacent to the selected parking space changes.

According to several aspects of the present disclosure, a vehicle having a dual head-up display (HUD) system includes a plurality of on-board sensors adapted to detect and monitor vehicle driving characteristics, a wireless communication module adapted to receive information from external sources, a driver monitoring system adapted to track a position of a driver's eyes, a system controller in electronic communication with the plurality of on-board sensors, the driver monitoring system and the wireless communication module, and adapted to identify parking spaces within proximity to the vehicle, capture, with at least one image capturing device in electronic communication with the system controller, images of an environment surrounding the vehicle, detect, with at least one non-visual sensor in electronic communication with the system controller, objects within the environment surrounding the vehicle, identify location markers for the identified parking spaces and objects within the environment surrounding the vehicle adjacent to the identified parking spaces, and determine a position of the vehicle relative to the identified location markers for the identified parking spaces and objects within the environment surrounding the vehicle adjacent to the identified parking spaces, project, with a light source of a projection module of an augmented reality HUD, first information related to the identified parking spaces upward to a first portion of the windshield that is substantially clear, wherein the first information is reflected to the eyes of the driver of the vehicle and the driver of the vehicle perceives the first information within a far image plane overlayed onto the identified parking spaces, project, with a light source of a projection module of a reflective HUD, second information related to the identified parking spaces in proximity to the vehicle upward to a second portion of the windshield that is substantially opaque, wherein the second information is reflected to the eyes of the driver of the vehicle and the driver of the vehicle perceives the second information displayed on the second portion of the windshield within a near image plane, determine, if the vehicle is performing a parking maneuver, based on data from the plurality of on-board sensors and data received by the wireless communication module, and when the vehicle is performing a parking maneuver into a selected one of the identified parking spaces, project, with the light source of the projection module of the augmented reality HUD, a first parking assist graphic adapted to provide guidance to a driver of the vehicle while parking the vehicle in the selected parking space upward to the first portion of the windshield, wherein the first parking assist graphic is reflected to the eyes of the driver of the vehicle and the driver of the vehicle perceives the first parking assist graphic within the far image plane overlayed onto the selected parking space, and project, with the light source of the projection module of the reflective HUD, a second parking assist graphic adapted to provide guidance to the driver of the vehicle while parking the vehicle in the selected parking space upward to the second portion of the windshield, wherein the second parking assist graphic is reflected to the eyes of the driver of the vehicle and the driver of the vehicle perceives the second parking assist graphic displayed on the second portion of the windshield within the near image plane, the system controller further adapted to probabilistically calculate, using a machine learning algorithm, a probability that the driver will park within each identified parking space, determine the first information and the second information based on the calculated probabilities, probabilistically calculate, using the machine learning algorithm, a preferred location within the selected parking space, and determine the first parking assist graphic and the second parking assist graphic based on the preferred location.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
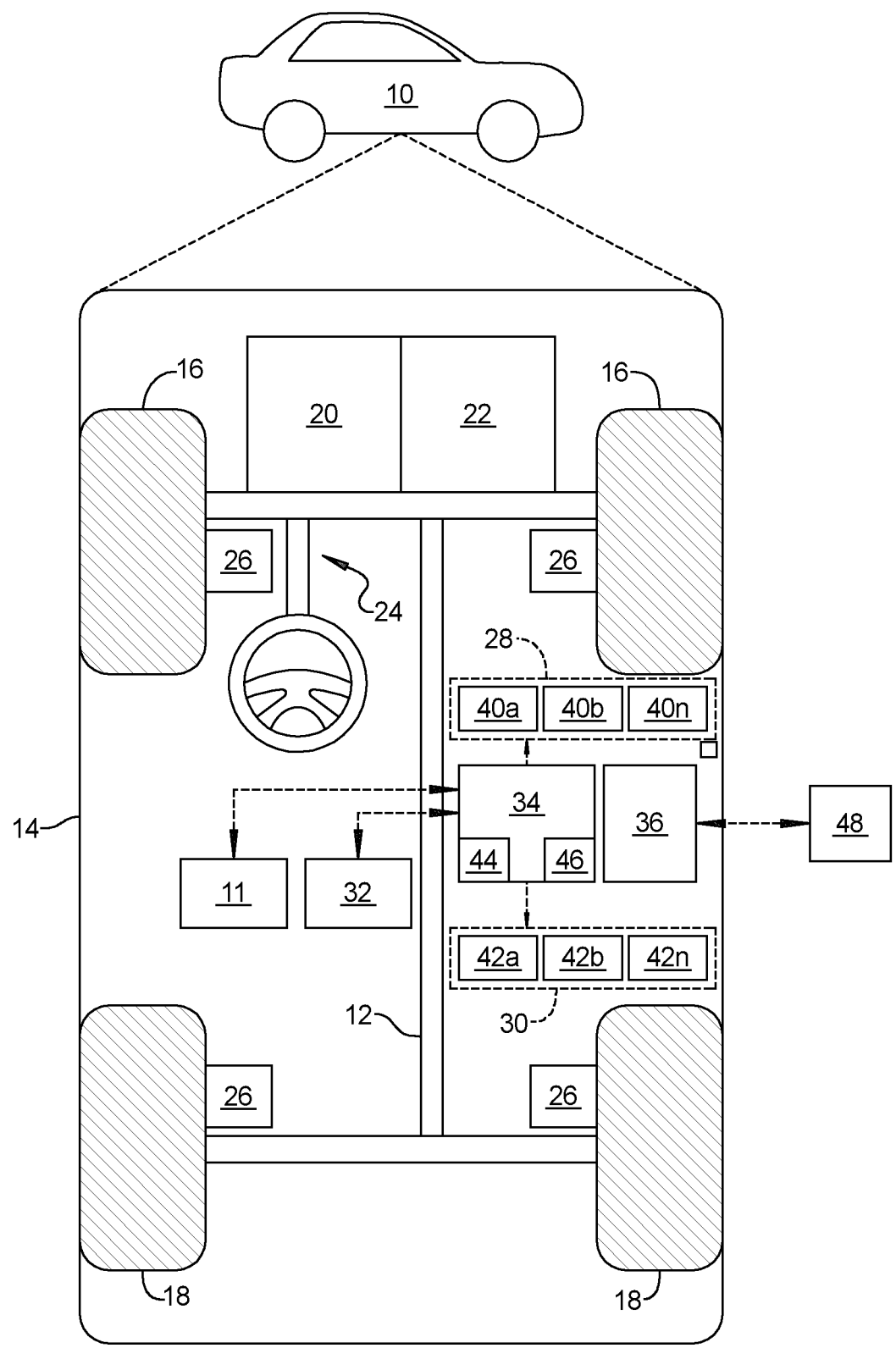
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, including autonomous or semi-autonomous vehicles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing parking notifications and parking assistance to a driver within the vehicle 10. In general, the system 11 works in conjunction with other systems within the vehicle 10 to display various information and infotainment content for the driver. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The system 11 can be utilized to provide information to an autonomous vehicle controller for autonomous parking maneuvers. The novel aspects of the present disclosure are also applicable to non-autonomous vehicles, wherein the system provides identification of available parking spaces, information related to the identified parking spaces, and graphics/information adapted to assist the driver throughout a parking maneuver.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2A:
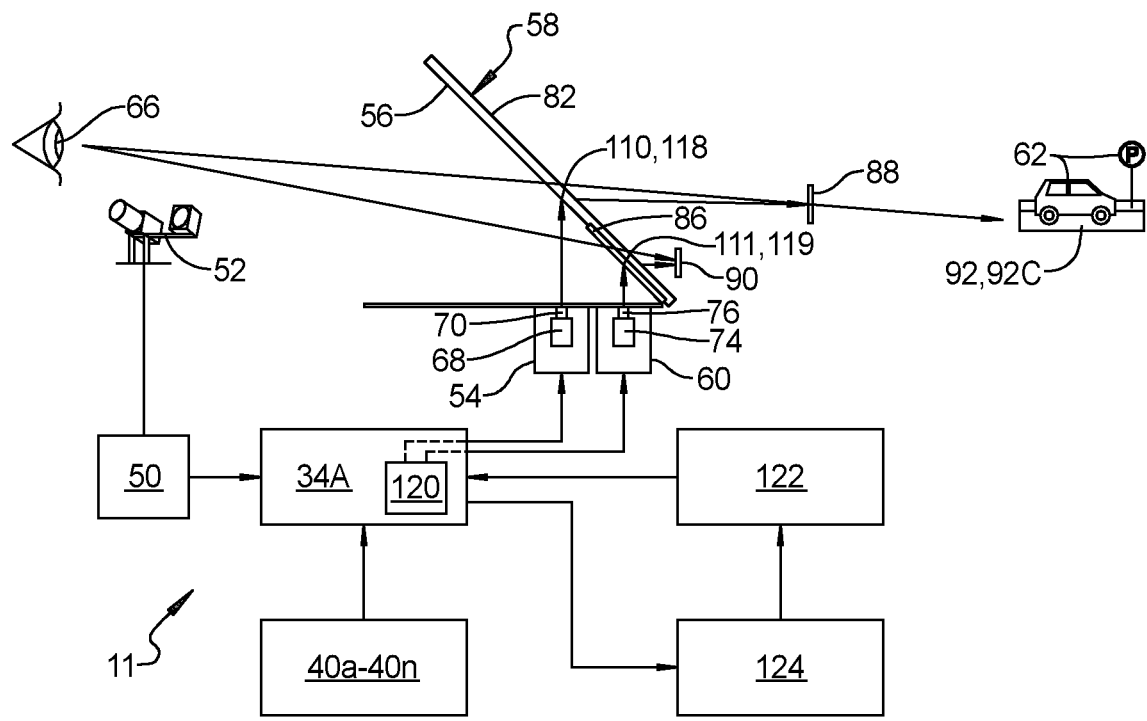
FIG. 2A is a schematic illustration of a dual head-up display system according to an exemplary embodiment.

Referring to FIG. 2A a schematic diagram of the system 11 is shown. The system 11 includes a system controller 34A in communication with the plurality of sensing devices (onboard sensors) 40a-40n. The plurality of onboard sensors 40a-40n are adapted to detect and monitor vehicle driving characteristics. The plurality of onboard sensors 40a-40n includes at least one non-visual sensor that is adapted to detect objects 62 within an environment 64 surrounding the vehicle 10 and at least one image capturing device adapted to capture images of the environment 64 surrounding the vehicle 10. The at least one non-visual sensor includes one or more sensors that are adapted to detect a position, velocity, and direction of travel of objects 62 in the environment 64 surrounding the vehicle 10. By way of non-limiting examples, the at least one non-visual sensor may include one or more sensors such as radar, LiDAR, and infrared sensors, however, it is to be appreciated that other sensors that employ non-visual techniques to detect the presence of objects 62 may be used as well. The at least one image-capturing device may include cameras that obtain periodic or sequential images of the environment 64 surrounding the vehicle 10 and objects 62 therein. The plurality of on-board sensors 40a-40n further includes sensors mounted within the vehicle 10 that are adapted to monitor driving characteristics of the vehicle 10, including, but not limited to, speed, input angle of the steering wheel, acceleration, braking, etc.

The system controller 34A may be the vehicle controller 34, or the system controller 34A may be a separate controller in communication with the vehicle controller 34. In addition to the plurality of onboard sensors 40a-40n, the system controller 34A is in communication with a driver monitoring system 50 having at least one camera 52 and adapted to track a position of the driver's head and eyes 66 as well as the orientation or gaze location of the driver's eyes 66. The system controller 34A is further in communication with the wireless communication module 36. The wireless communication module 36 is located within the system controller 34A and is adapted to allow wireless communication between the vehicle 10 and other vehicles or other external sources. The system controller 34A is adapted to collect information from databases via a wireless data communication network over wireless communication channels such as a WLAN, 4G/LTE or 5G network, or the like. Such databases can be communicated with directly via the internet, or may be cloud-based databases. Information that may be collected by the system controller 34A from such external sources 48 includes, but is not limited to road and highway databases maintained by the department of transportation, a global positioning system, the internet, other vehicles via V2V communication networks, traffic information sources, vehicle-based support systems such as OnStar, etc.

The system 11 further includes an augmented reality head up display system (AR-HUD) 54 in communication with the system controller 34A and adapted to project images onto an inner surface 56 of a windshield 58 of the vehicle 10, and a reflective head up display system (R-HUD) 60 in communication with the system controller 34A and adapted to project images onto the inner surface 56 of the windshield 58 of the vehicle 10. Images projected by the AR-HUD 54 and the R-HUD 60 are reflected, by the inner surface 56 of the windshield 58 to the eyes 66 of the driver.

In an exemplary embodiment, the AR-HUD 54 includes a projection module 68 including at least one light source 70 that is adapted to project an image upon the inner surface 56 of the windshield 58 of the vehicle 10. As described herein, the at least one light source 70 comprises a laser, however, it should be understood that the at least one light source 70 may be other known types of light sources used in head-up display systems. In an exemplary embodiment, the projection module 68 of the AR-HUD 54 is a holographic projection module and includes an exit pupil replicator. The holographic image is projected into the exit pupil replicator and then propagates inside the exit pupil replicator and is extracted multiple times before being projected upward to the inner surface 56 of the windshield 58, as indicated by arrow 72. The re-circulation of the light several times within the exit pupil replicator expands the pupil so the viewer can see the holographic image from an extended eye-box. In addition to expanding the eye-box, the exit pupil replicator also magnifies the original projected image coming out of the light source 70. A spatial light modulator is positioned between the light source 70 and the exit pupil replicator. The spatial light modulator is adapted to receive the light from the light source 70, to diffract the laser light with an encoded hologram and to deliver the diffracted laser to the exit pupil replicator. As shown and described herein, the AR-HUD 54 is a holographic head-up system, however, it should be understood that the novel features of the present disclosure are applicable to other head-up display configurations.

Figure 2B:
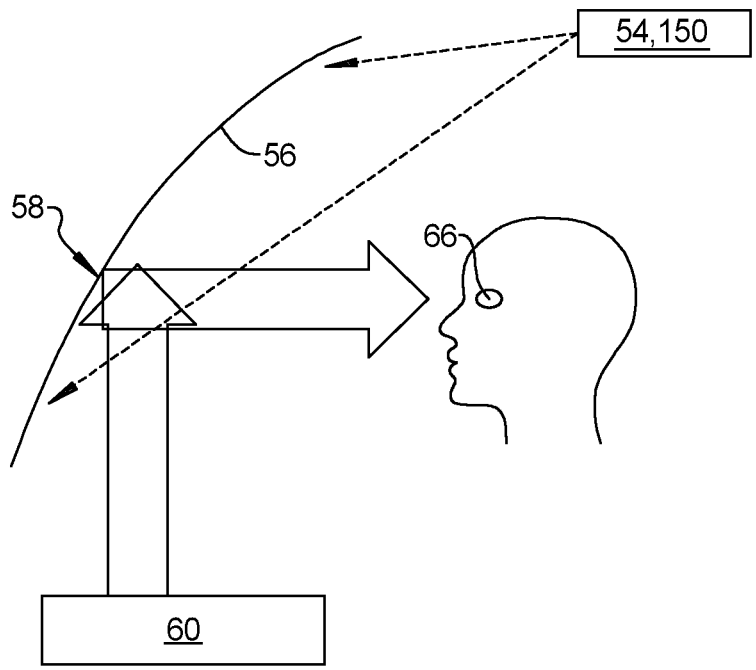
FIG. 2B is a schematic illustration of an alternate embodiment of the dual head-up display system shown in FIG. 2A.

Referring to FIG. 2B, in another exemplary embodiment, the AR-HUD 54 comprises a digital light projector (DLP) 150 adapted to project images onto the inner surface 56 of the windshield 58 of the vehicle 10. The DLP 150 includes a light source adapted to project an excitation light, a condensing lens adapted to focus the excitation light from the light source, a color filter (color wheel) adapted to split the focused excitation light into red, green and blue light, a shaping lens adapted to focus the excitation light passing through the color filter, a digital micro-mirror device (DMD) adapted to re-direct the excitation light, and a projection lens adapted to receive the excitation light from the DMD and project the excitation light to the inner surface 56 of the windshield 58.

The windshield 58 is equipped with features capable of displaying an image projected thereupon while remaining transparent or substantially transparent such that occupants of the vehicle 10 can clearly observe outside of the vehicle 10 through the windshield 58. It should be understood that, as depicted, the windshield 58 is in the front of the vehicle 10, other surfaces within the vehicle 10 could be used for projection, including side windows and a rear window. Additionally, the view on the front windshield 58 could be continued upon the front vehicle "A-pillars" and onto the side windows as a continuous image. The windshield 58 is both transparent and capable of displaying images projected by an excitation light. An occupant within the vehicle is able to see an arbitrary object through a substrate positioned on the windshield 58. The substrate may be transparent or substantially transparent. While the occupant sees objects through the substrate, the occupant can also see images that are created at the substrate. The substrate may be part of the windshield 58, a glass substrate, a plastic substrate, a polymer substrate, or other transparent (or substantially transparent) medium that would be appreciated by one of ordinary skill in the art. Other substrates may complement the substrate to provide for tinting, substrate protection, light filtering (e.g. filtering external ultraviolet light), and other functions. The substrate receives excitation light from the light source. The received excitation light may be absorbed by light emitting material at the substrate. When the light emitting material receives the excitation light, the light emitting material emits visible light. Accordingly, images may be created at the substrate by selectively illuminating the substrate with excitation light.

In an exemplary embodiment, the light emitting material includes transparent phosphors that are embedded into the substrate. The transparent phosphors are light emitting particles which fluoresce in response to being excited by the excitation light. In an exemplary embodiment, the transparent phosphors are red, green, and blue (RGB) phosphors, allowing full color. The use of monochrome and/or two-color phosphors is also within the scope of the present disclosure. When excitation light is absorbed by the transparent phosphors, visible light is emitted by the transparent phosphors. The excitation light is provided by the light source. Use of the substrate and light emitting material to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

In an exemplary embodiment, the light source is a micromirror array (MMA) projector (e.g. a digital light processing (DLP) projector 150). In the DLP 150, images are created by microscopically small mirrors laid out in a matrix on a semiconductor chip within the DMD. An MMA projector that outputs ultraviolet light may be similar to an MMA projector that outputs visible light, except that the color filter has light filters that are tailored to the ultraviolet light spectrum. In other embodiments, the DLP 150 is a liquid crystal display (LCD) projector. In embodiments, the DLP 150 may be a liquid crystal on silicon (LCOS) projector. In embodiments, the DLP 150 may be an analog projector (e.g. a slide film projector or a movie film projector). One of ordinary skill in the art would appreciate other types of projectors which may be used to project ultraviolet light on the substrate.

Figure 3A:
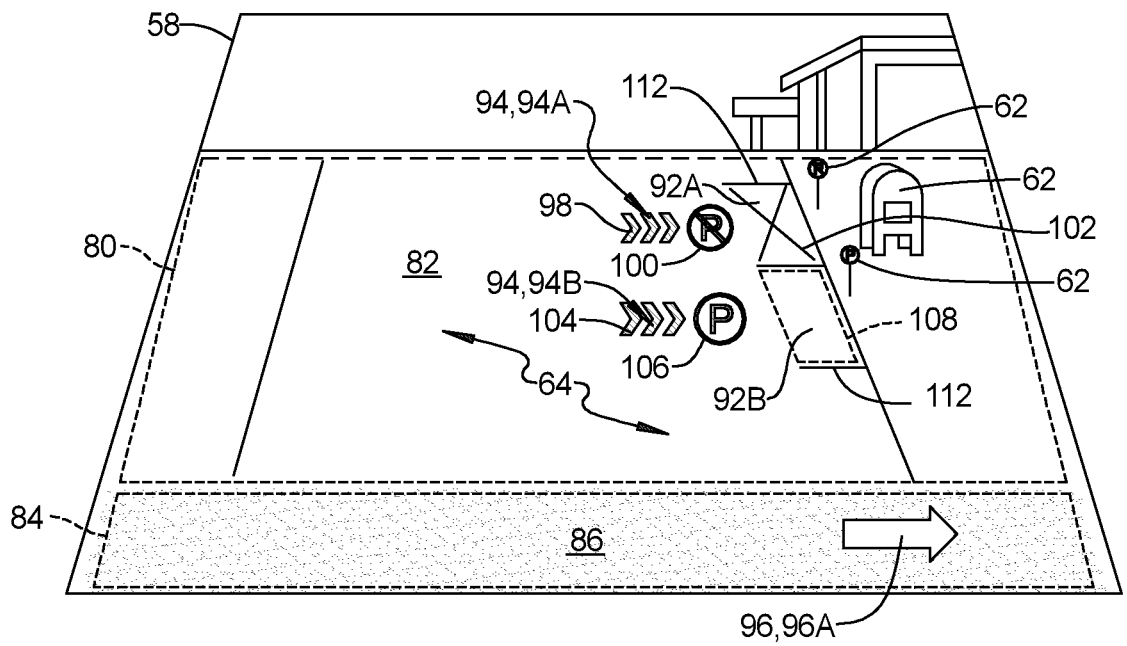
FIG. 3A is a representation of a windshield of a vehicle, wherein identified parking spaces are visible in front of the vehicle and first information is displayed within a far image plane within a first portion of the windshield and second information is displayed within a near image plane within a second portion of the windshield.

Referring to FIG. 3A, the AR-HUD 54 projects images that are perceived by the driver in a far image plane 80. FIG. 3 is an exemplary interior view of the windshield 58, where the environment 64 surrounding the vehicle 10 is visible through the windshield 58 and images projected by the AR-HUD 54 are perceived by the driver overlayed onto the environment 64 surrounding the vehicle 10. In an exemplary embodiment, the vehicle windshield 58 includes a first portion 82 that is substantially clear, the far image plane 80 being viewed by the driver through the first portion 82 of the windshield, and referring to FIG. 1, appearing to the driver within the far image plane 80, as indicated at 88.

The R-HUD 60 includes a projection module 74 including at least one light source 76 that is adapted to project an image upon the inner surface 56 of the windshield 58 of the vehicle 10. As with the AR-HUD 54, the light source may be a laser, or may be other known types of light sources used in head-up display systems. Light from the light source 76 of the projection module 74 of the R-HUD is projected upward to the inner surface 56 of the windshield 58, as indicated by arrow 78.

Referring again FIG. 3A, the R-HUD projects images that are perceived by the driver in a near image plane 84. FIG. 3A is an exemplary interior view of the windshield 58, where the environment 64 surrounding the vehicle 10 is visible through the first portion 82 of the windshield 58 and images projected by the R-HUD 60 are perceived by the driver displayed on the windshield 58 below the first portion 82. In an exemplary embodiment, the vehicle windshield 58 includes a second portion 86 that is substantially opaque, the near image plane 84 being perceived by the driver reflected from the second portion 86 of the windshield 58, and referring to FIG. 1, appearing to the driver within the near image plane 84, as indicated at 90.

The system controller 34A is adapted to use the plurality of onboard sensors 40a-40n and data received form external sources 48 via the wireless communication module 36 to identify parking spaces 92 within proximity of the vehicle 10, and to display, with the AR-HUD 54, first information 94 related to identified parking spaces 92 in proximity to the vehicle 10 and, display, with the R-HUD 60, second information 96 related to the identified parking spaces 92 in proximity to the vehicle 10.

First information 94 related to identified parking spaces 92 may include identification/highlighting of the identified parking spaces 92 to bring to the driver's attention the presence and availability of the identified parking spaces, or details about costs associated with the identified parking spaces 92. For example, referring again to FIG. 3A, the system controller 34A has identified two parking spaces 92A, 92B along the street on which the vehicle 10 is traveling. As shown, the first information 94 includes a first indicator 94A alerting the driver to the presence of a first parking space 92A and a second indicator 94B alerting the driver to the presence of a second parking space 92B. As shown, the first indicator 94A includes chevrons 98 alerting the driver to the presence of the first parking space 92A to the right side of the roadway and a symbol 100 indicating that parking is not available within the first parking space 92A. In another example, the first indicator 94A may include a graphic 102 which appears overlayed onto the first parking space 92A indicating that the first parking space 92A is not available for parking, such as the "X" shown in FIG. 3A. Further, the second indicator 94B includes chevrons 104 alerting the driver to the presence of the second parking space 92B to the right side of the roadway and a symbol 106 indicating that parking is available within the second parking space 92B. In another example, the second indicator 94B may include a graphic 108 which appears overlayed onto the second parking space 92B indicating that the second parking space 92B is available for parking, such as the highlighting 108 that appears overlayed onto the second parking space in FIG. 3A.

In an exemplary embodiment, the system controller 34A is adapted to capture, with at least one image capturing device 40a-40n in electronic communication with the system controller 34A, images of the environment 64 surrounding the vehicle 10, detect, with at least one non-visual sensor 40a-40n in electronic communication with the system controller 34A, objects 62 within the environment 64 surrounding the vehicle 10, identify location markers 112, such as pavement markings for the identified parking spaces and objects, such as signage and other vehicles, within the environment 64 surrounding the vehicle 10 adjacent to the identified parking spaces 92, and determine a position of the vehicle 10 relative to the identified location markers 112 for the identified parking spaces 92 and objects 62 within the environment 64 surrounding the vehicle 10 adjacent to the identified parking spaces 92.

The system controller 34A obtains the first information 94 from data received, via the wireless communication module 36, from remote sources 48, such as a city infrastructure system that provides information about the availability, cost, restrictions, etc. associated with identified parking spaces 92. Additionally, the system controller 34A can acquire the first information 94 from data collected by the onboard sensors 40a-40n, visually detecting location markers 112 (signage and pavement markings) and using computer vision algorithms to interpret such signage and pavement markings to determine precise location of and availability of identified parking spaces 92.

The system controller 34A instructs the projection module 68 of the AR-HUD 54 to project the first information 94 upon the windshield 58 so the first information 94 appears within the far image plane 80 overlaid at a position upon the windshield 58 where the first information 94 appears to the driver to be positioned in front of the vehicle 10 in proper proximity to the parking space 92 or object 62 to which the first information 94 pertains. The occupant monitoring system 50 includes sensors known in the art to approximate a location of the head of an occupant and further the orientation or gaze location of the eyes of the occupant. Based upon the output of the occupant monitoring system 50 and input data tracking location information regarding the environment around the vehicle 10, the system 11 can accurately position the first information 94 such that the occupant sees the first information 94 overlaid with visual images through the windshield 58.

The system 11 described above includes eye sensing and head sensing devices allowing estimation of eye location, allowing registration of images upon the windshield 58 such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 58 are contemplated, and the disclosure is not intended to be limited to the particular embodiments described herein.

In an exemplary embodiment, when displaying, with the AR-HUD 54, the first information 94 related to identified parking spaces 92 in proximity to the vehicle 10, the system controller 34A is further adapted to calculate a first location 110 within the first portion 82 of the windshield 58 based on data received from the driver monitoring system 50, the at least one image capturing device and the at least on non-visual sensor (included within the plurality of onboard sensors 40a-40n), and to project the first information 94 upward to the first location 110, wherein the first information 94 is perceived by the driver properly positioned relative to the identified parking spaces 92. Further, the system controller 34A continuously, on a periodic cycle, re-calculates the first location 110 based on data received from the driver monitoring system 50, the onboard sensors 40a-40n as a position of the head an eyes 66 of the driver move and as the position of the vehicle 10 relative to the identified parking spaces 92 changes.

Second information 96 related to identified parking spaces 92 may also include identification/highlighting of the identified parking spaces 92 to bring to the driver's attention the presence and availability of the identified parking spaces 92, or details about costs associated with the identified parking spaces 92. For example, referring again to FIG. 3A, the system controller 34A has identified two parking spaces 92A, 92B along the street on which the vehicle 10 is traveling. As shown, the second information 96 includes an arrow 96A indicating the presence of available parking spaces on the right. As shown, the second information includes a generic indication of available parking spaces 92 to the right, however, the second information may also include space-specific information, similarly to the first information 94, and may be positioned within the second portion 86 of the windshield 58 to align with or appear in proximity to specific identified parking spaces 92.

Just as with the first information 94, the system controller 34A obtains the second information 96 from data received, via the wireless communication module 36, from remote sources 48, such as a city infrastructure system that provides information about the availability, cost, restrictions, etc. associated with identified parking spaces 92. Additionally, the system controller 34A can acquire the second information 96 from data collected by the onboard sensors 40a-40n, visually detecting location markers 112 (signage and pavement markings) and using computer vision algorithms to interpret such signage and pavement markings to determine precise location of and availability of identified parking spaces 92.

The system controller 34A instructs the projection module 74 of the R-HUD 60 to project the second information 96 upon the windshield 58 so the second information 96 appears within the near image plane 84 overlaid at a position upon the windshield 58 where the second information 96 appears to the driver to be positioned in proper proximity to the parking space 92 or object 62 to which the second information pertains. In an exemplary embodiment, when displaying, with the R-HUD 60, the second information 96 related to identified parking spaces 92 in proximity to the vehicle 10, the system controller 34A is further adapted to calculate a location 111 within the second portion 86 of the windshield 58 based on data received from the driver monitoring system 50, the at least one image capturing device and the at least on non-visual sensor (included within the plurality of onboard sensors 40a-40n), and to project the second information 96 upward, wherein the second information 96 is perceived by the driver properly positioned relative to the identified parking spaces 92.

In an exemplary embodiment, the system controller 34A is further adapted to determine if an emergency vehicle is approaching the vehicle 10, based on data from the plurality of on-board sensors 40a-40n and data received by the wireless communication module 36. The system controller 34A may, by using computer vision analysis of captured images, identify emergency vehicles based on the appearance of the emergency vehicle, the presence of flashing lights, or by audibly detecting approaching sirens. Further, data collected via the wireless communication module 36 may include information from remote entities 48, such as emergency scanner channels or other emergency responder resources, alerting the system controller 34A to the presence of nearby emergency vehicles, such as police cars, ambulances, fire-trucks, etc., and determine the location of such emergency vehicles relative to the vehicle 10, and a predicted route of the emergency vehicle.

Figure 3B:
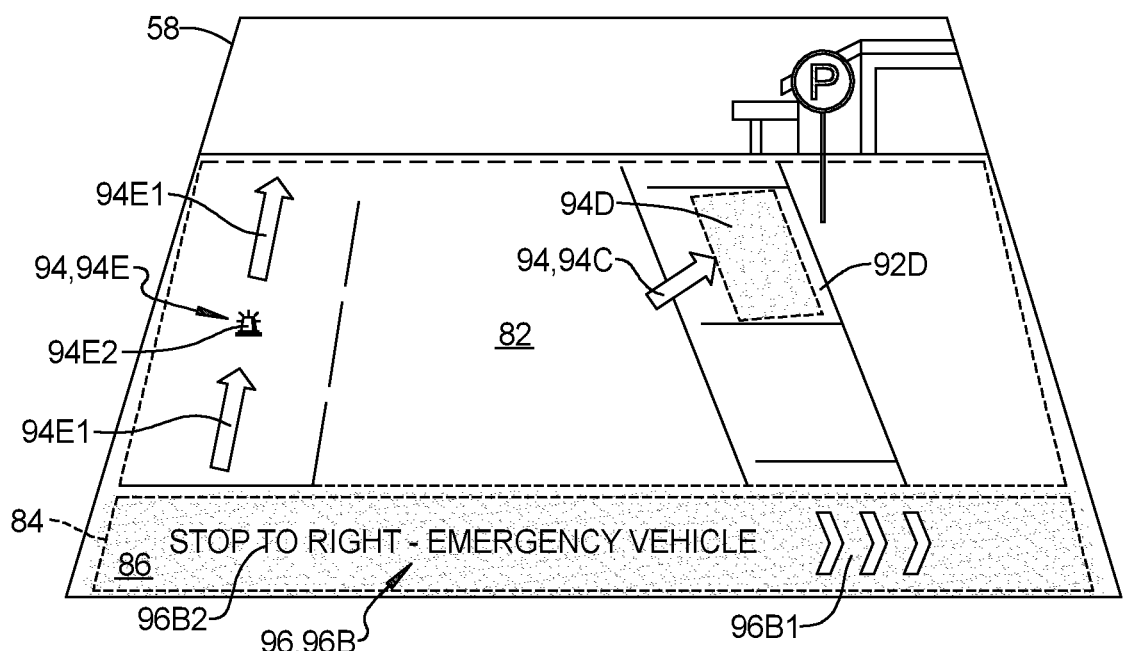
FIG. 3B is a representation of the windshield of the vehicle shown in FIG. 3A wherein the first information and second information includes graphics related to an approaching emergency vehicle.

When the system controller 34A determines that an emergency vehicle is approaching the vehicle, the system controller 34A is adapted to display, with the augmented reality HUD 54, first information 94 including graphics 94C adapted to alert a driver of the vehicle 10 that the emergency vehicle is approaching and to direct the driver to a parking space 92 to allow the emergency vehicle to pass. Referring to FIG. 3B, when the system controller 34A determines that an emergency vehicle is approaching, the system controller 34A selects the closest available parking space 92D, and displays first information 94 that includes a graphic 94C (as shown, an arrow) directing the driver of the vehicle 10 to the closest parking space 92D. The system controller 34A, when possible, will also determine from what direction and in what lane the emergency vehicle is approaching, and will select a closest available parking space 92D that gets the vehicle 10 out of the path of the emergency vehicle. For example, as shown in FIG. 3B, the graphic 94C displayed with the first information 94 includes an arrow indicating that the driver should move the vehicle 10 to the closest parking space 92D on the right side, as the emergency vehicle is approaching in the lane to the left of the vehicle 10. By way of non-limiting examples, the first information 94 may further include highlighting 94D to identify the closest parking space 92D, and/or route graphics 94E, indicating the route of the approaching emergency vehicle. Such route graphics 94E, as shown, may include arrows 94E1 and/or icons 94E2 to highlight the projected route of the approaching emergency vehicle 10.

Further, when the system controller 34A determines that an emergency vehicle is approaching the vehicle 10, the system controller 34A is adapted to display, with the R-HUD 60, second information 96 including graphics 96B adapted alert the driver of the vehicle 10 that the emergency vehicle is approaching and to direct the driver to the closest parking space 92D to allow the emergency vehicle to pass. For example, as shown in FIG. 3B, the graphic 96B displayed with the second information 96 includes chevrons or arrows 96B1 indicating that the driver should move the vehicle 10 to the closest parking space 92D on the right side, as the emergency vehicle is approaching in the lane to the left of the vehicle 10. The graphic 96B of the second information 96 may further include a textual message 96B2 giving the driver information related to the approaching emergency vehicle.

The system controller 34A is further adapted to use the plurality of onboard sensors 40a-40n and data received form external sources 48 via the wireless communication module 36 to determine when the vehicle 10 is performing a parking maneuver into a selected one 92C of the identified parking spaces 92 or a closest parking space 92D, as directed by the system controller 34A. When the system controller 34A determines that the vehicle 10 is performing a parking maneuver into the selected parking space 92C, the system controller 34A is adapted to display, with the AR-HUD 54, a first parking assist graphic 114 adapted to provide guidance to the driver of the vehicle 10 while parking the vehicle 10 in the selected parking space 92C, and to display, with the R-HUD 60, a second parking assist graphic 116 adapted to provide guidance to the driver of the vehicle 10 while parking the vehicle 10 in the selected parking space 92C.

The system controller 34A is adapted to determine if the vehicle 10 is performing a parking maneuver, based on data from the plurality of on-board sensors 40a-40n and data received by the wireless communication module 36. For example, the system controller 34A will collect data from the on-board sensors 40a-40n to determine vehicle speed and input angle of the steering wheel. If the vehicle 10 is travelling at a slow speed, and the steering wheel angle indicates a sharp turn, the system controller 34A receives that input and identifies these as conditions indicating that a parking maneuver may be in progress. In addition, the system controller 34A will collect data from external sources, such as GPS, to determine the location of the vehicle 10. If data from external sources indicates that the vehicle 10 is positioned near a parking space 92, or within a parking lot/structure, the system controller 34A will use that data as another indication that the vehicle 10 is performing a parking maneuver.

Once the system controller 34A determines that a parking maneuver is in progress, the system controller 34A is further adapted to capture, with the at least one image capturing device, images of the environment 64 surrounding the vehicle 10, and to detect, with the at least one non-visual sensor, objects 62 within the environment 64 surrounding the vehicle 10. The system controller 34A uses the at least one non-visual sensor and the at least one image capturing device to identify location markers 112 for a selected parking space 92C into which the vehicle 10 is being parked, and objects 62 within the environment 64 surrounding the vehicle 10 adjacent the selected parking space 92C. Location markers 112 for the selected parking space 92C may include, but are not limited to, painted lines on the pavement, curbsides, and signage. Objects 62 that may be detected include, but are not limited to, other vehicles, signage, buildings, permanent and temporary traffic directing objects, such as barricades, cones, barrels, and guardrails, and other objects such as fallen trees, pedestrians, and animals that may be in the vicinity of the selected parking space 92C.

The system controller 34A determines the position of the vehicle 10 relative to the identified location markers 112 for the selected parking space 92C and objects 62 within the environment 64 surrounding the vehicle 10 adjacent to the selected parking space 92C and displays, with the AR-HUD 54, the first parking assist graphic 114, and displays, with the R-HUD 60, the second parking assist graphic 116. After identifying relevant location markers 112 for the selected parking space 92C, the system controller 34A determines the position of the vehicle 10 relative to the identified location markers 112 to determine the vehicle's relative position as the vehicle 10 approaches the selected parking space 92C. As the vehicle 10 approaches and enters the selected parking space 92C, the system controller 34A will display an appropriate first parking assist graphic 114 and an appropriate second parking assist graphic 116 to guide the driver of the vehicle 10 to an optimal position within the selected parking space 92C, as determined by the system controller 34A.

Figure 5:
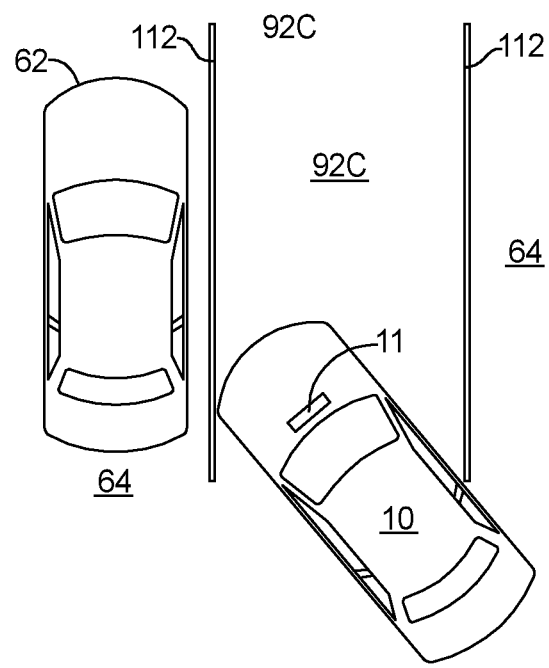
FIG. 5 is a schematic diagram of a vehicle performing a parking maneuver into a selected parking space.

As the vehicle 10 is entering the selected parking space 92C, the system controller 34A will display an appropriate first parking assist graphic 114 and an appropriate second parking assist graphic 116 to guide the driver of the vehicle 10 to a position where the vehicle 10 is centered between the identified location markers 112 for the selected parking space 92C. In addition, the system controller 34A will guide the vehicle 10 into the selected parking space 92C according to identified objects 62 within the environment 64 surrounding the vehicle 10 adjacent the selected parking space 92C. Referring to FIG. 5, if there are no objects 62 adjacent the selected parking space 92C, the system controller 34A may guide the vehicle 10 along a path that overlaps the identified location markers 112 as the vehicle 10 turns into the selected parking space 92C. However, if objects 62, such as the other vehicle shown in FIG. 5, are identified in the environment 64 surrounding the vehicle 10 adjacent the selected parking space 92C the system controller 34A will provide a first parking assist graphic 114 and a second parking assist graphic 116 that guides the vehicle 10 along a path that does not intersect with such identified objects 62. As shown in FIG. 5, the system controller 34A will provide a first parking assist graphic 114 and a second parking assist graphic 116 that guides the vehicle 10 along a path into the selected parking space 92C such that the vehicle 10 will not collide with the identified object/vehicle 62 immediately adjacent the selected parking space 92C. Such first and second parking assist graphics 114, 116 may also be displayed as the vehicle 10 exists the selected parking space 92C to ensure the vehicle 10 does not collide with identified adjacent objects 62.

Figure 4:
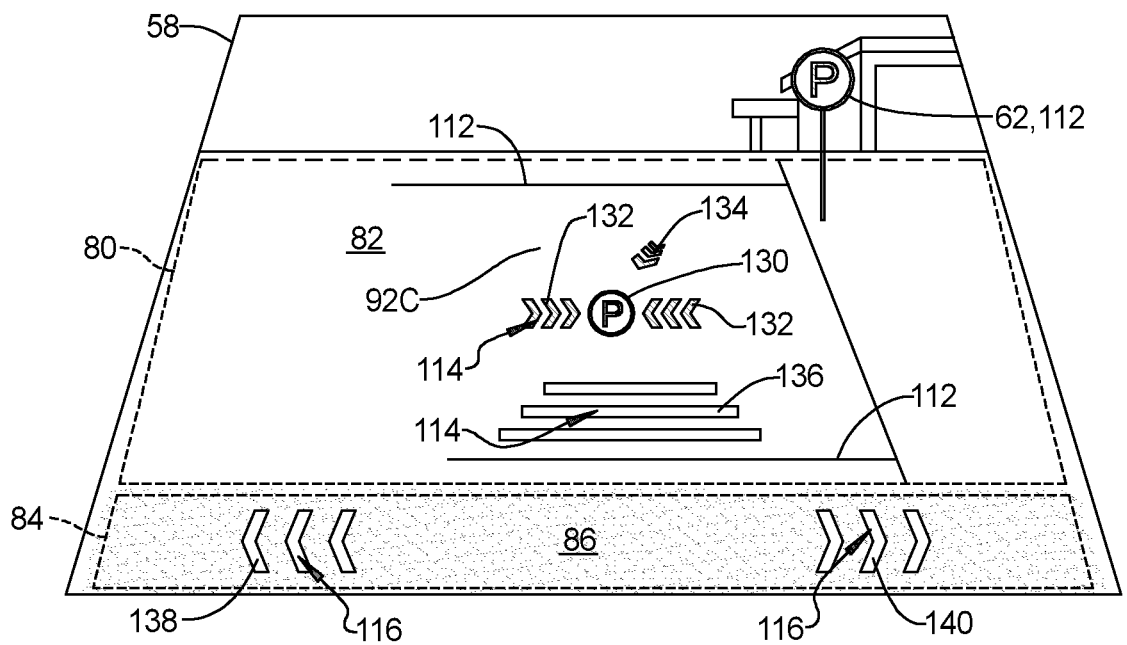
FIG. 4 is a representation of the windshield of the vehicle, wherein a selected parking space is visible in front of the vehicle and first parking assist graphics are displayed within the far image plane within the first portion of the windshield and second parking assist graphics are displayed within the near image plane within the second portion of the windshield.

The first and second parking assist graphics 114, 116 are adapted to provide a visual cue to the driver indicating that the driver must adjust the path of the vehicle 10 in order to bring the vehicle 10 to the optimal location within the selected parking space 92C and to avoid identified objects 62. Such first and second parking assist graphics 114, 116 are adapted to provide instruction to the driver of the vehicle 10 that the path of the vehicle 10 should be altered to the left or right. Referring again to FIG. 4, as shown, in a non-limiting example, the first parking assist graphic 114 includes a circled P 130 and chevrons 132 on either side of the circled P 130 indicating the lateral position, left and right, relative to the optimal location within the selected parking space 92C, as well as top chevrons 134 above the circled P 130. The top chevrons 134 above the circled P 130 provide indication to the driver of the longitudinal position, forward and backward, relative to the optimal location within the selected parking space 92C. Also shown in FIG. 4, in another non-limiting example, the first parking assist graphic 114 includes a stack of longitudinal line indicators 136 that provide indication of the vehicle position relative to an optimal longitudinal position within the selected parking space 92C.

To provide indication to the driver that the path of the vehicle 10 must be altered, left or right, the chevrons 132 of the first parking assist graphic 114 may be modified, such as, for example, including three chevrons 132 on the left of the circled P 130, as shown, and only one chevron 132 on the right, indicating to the driver to steer more toward the left side of the selected parking space 92C. In another example, there are three chevrons 132 on either side of the circled P 130, however, the brightness or color of the chevrons 132 the right side vary, or the chevrons 132 on one side of the circled P 130 are smaller than the chevrons 132 on the opposite side of the circled P 130. In another example, there are three chevrons 132 on either side of the circled P 130, however, the circled P 130 is shown off-centered relative to the chevrons 132. Number of chevrons, size, spacing and color are all characteristics of the first parking assist graphic 114 that may provide indication to the driver to alter the path of the vehicle 10 into the selected parking space 92C.

To provide indication to the driver of the location of the vehicle relative to the optimal longitudinal position within the selected parking space 92C, the chevrons 134 above the circled P 130 or the longitudinal line indicators 136 may be modified by relative display location, color, size and spacing as well.

Referring again to FIG. 4, as shown, in a non-limiting example, the second parking assist graphic 116 includes left side chevrons 138 and right side chevrons 140 displayed within the near image plane 84 reflected from the second portion 86 of the windshield 58. Modifying the location of the chevrons 138, 140 within the near image plane 84, as well as the spacing, number of, color and size of the chevrons 138, 140 provides indication to the driver of the vehicle 10 of the lateral, left and right, position of the vehicle 10 relative to an optimal location within the selected parking space 92C.

It should be understood that the examples cited herein are merely for description, and that the first parking assist graphic 114 and the second parking assist graphic 116 could include other text and/or designs adapted to provide textual and/or graphic indication to the driver of the relative location of the vehicle 10 relative to an optimal position within the selected parking space 92C as the vehicle 10 enters the selected parking space 92C.

Further, the first and second parking assist graphics 114, 116 may also be animated, wherein, as the vehicle 10 path changes, and the vehicle 10 approaches the optimal location within the selected parking space 92C, the displayed first and/or second parking assist graphics 114, 116 change. For example, as the vehicle 10 gets closer to the optimal location within the selected parking space 92C, the displayed first and/or second parking assist graphics 114, 116 may become larger, or the color may change, spacing between different features may change, or the first and/or second parking assist graphic 114, 116 may pulse or expand/contract. The first and second parking assist graphics 114, 116 may also be adapted to provide a visual cue to the driver indicating that the vehicle 10 is at the optimal position within the selected parking space 92C. Such first and second parking assist graphics 114, 116 alert the driver to begin bringing the vehicle 10 to a stop within the selected parking space 92C, as the vehicle approaches the optimal location within the selected parking space 92C, and further provide indication to the driver once the vehicle 10 reaches the optimal position within the selected parking space 92C.

The system controller 34A includes an image generation engine 120 which includes a programmable processor including programming to monitor various inputs and determine what information is appropriate to include within the first and second information 94, 96 and the first and second parking assist graphics 114, 116, and to generate appropriate text and/or graphics to include within the first and second information 94, 96 and the first and second parking assist graphics 114, 116 based on data received from the driver monitoring system 50, the at least one image capturing device and the at least on non-visual sensor (included within the plurality of onboard sensors 40*a*-40*n*), and data received via the wireless communication module 36. The image generation engine 120 includes display software and programming for translating requests to display information into graphical representations describing the information. Further, the system controller 34A and image generation engine 120 are adapted to continuously update the first and second information 94, 96 and the first and second parking assist graphics 114, 116 as data received from the driver monitoring system 50, the at least one image capturing device and the at least on non-visual sensor (included within the plurality of onboard sensors 40a-40n), and data received via the wireless communication module 36 changes.

The image generation engine 120 can communicate directly with various systems and components, or the image generation engine 120 can alternatively or additionally communicate over a LAN/CAN system. The image generation engine 120 utilizes information regarding the operational environment of the vehicle 10 derived from a number of inputs. The various sensing devices 40a-40n collect and provide information. The sensing devices 40a-40n include a camera or image capturing device taking periodic or sequential images representing a view from the vehicle 10. The windshield 58 is equipped with features capable of displaying and/or reflecting an image projected thereupon while remaining transparent or substantially transparent (within the first portion 82) such that occupants of the vehicle 10 can clearly observe outside of the vehicle 10 through the windshield 58. It should be understood that, as depicted, the windshield 58 is in the front of the vehicle 10, other surfaces within the vehicle 10 could be used for projection, including side windows and a rear window. Additionally, the view on the front windshield 58 could be continued upon the front vehicle "A-pillars" and onto the side windows as a continuous image.

The image generation engine 120 includes display software or programming translating requests to display information from the image generation engine 120 in graphical representations describing the information. The image generation engine 120 includes programming to compensate for the curved and tilted surface of the windshield 58 and any other surfaces onto which images are to be projected.

In an exemplary embodiment, the system controller 34A is further adapted to continuously identify location markers 112 and objects 62 within the environment 64 surrounding the vehicle 10 adjacent to the selected parking space 92C and determine the position of the vehicle 10 relative to the identified location markers 112 and objects 62 within the environment 64 surrounding the vehicle 10 adjacent to the selected parking space 92C, and to update, with the image generation engine 120 the displayed first parking assist graphic 114 and the displayed second parking assist graphic 116 as the position of the vehicle 10 relative to the identified location markers 112 and objects 62 within the environment 64 surrounding the vehicle 10 adjacent to the selected parking space 92C changes throughout the parking maneuver. The system controller 34A continuously repeats this process on a periodic basis, for example, every 0.1 second. Each time the system controller 34A re-establishes a position of the vehicle 10 relative to the identified location markers 112 and objects 62 within the environment 64 surrounding the vehicle 10 adjacent to the selected parking space 92C, the displayed first parking assist graphic 114 and the displayed second parking assist graphic 116 are updated accordingly if the position of the vehicle 10 has changed, or in light of newly identified or changed location markers 112 and objects 62 within the environment 64 surrounding the vehicle 10.

The system controller 34A instructs the projection module 68 of the AR-HUD 54 to project the first parking assist graphic 114 upon the windshield 58 so the first parking assist graphic 114 appears within the far image plane 80 overlaid at a position upon the windshield 58 where the first parking assist graphic 114 appears to the driver to be positioned in front of the vehicle 10 in proper proximity to the selected parking space 92C. In an exemplary embodiment, when displaying, with the AR-HUD 54, the first parking assist graphic 114, the system controller 34A is further adapted to calculate a second location 118 within the first portion 82 of the windshield 58 based on data received from the driver monitoring system 50, the at least one image capturing device and the at least on non-visual sensor (included within the plurality of onboard sensors 40a-40n), and to project the first parking assist graphic 114 upward to the second location 118, wherein the first parking assist graphic 114 is perceived by the driver properly positioned relative to the selected parking space 92C, location markers 112 for the selected parking space 92C and objects 62 within the environment 64 surrounding the vehicle 10 adjacent to the selected parking space 92C. Further, the system controller 34A continuously, on a periodic cycle, re-calculates the second location 118 based on data received from the driver monitoring system 50, the onboard sensors 40a-40n as a position of the head an eyes 66 of the driver move and as the position of the vehicle 10 relative to the selected parking spaces 92C changes throughout the parking maneuver.

The system controller 34A instructs the projection module 74 of the R-HUD 60 to project the second parking assist graphic 116 upon the windshield 58 so the second parking assist graphic 116 appears within the near image plane 84 overlaid at a position upon the windshield 58 where the first parking assist graphic 114 appears to the driver to be positioned in front of the vehicle 10 in proper proximity to the selected parking space 92C. In an exemplary embodiment, when displaying, with the R-HUD 60, the second parking assist graphic 116, the system controller 34A is further adapted to calculate a location 119 within the second portion 82 of the windshield 58 based on data received from the driver monitoring system 50, the at least one image capturing device and the at least on non-visual sensor (included within the plurality of onboard sensors 40a-40n), and to project the second parking assist graphic 116 upward to the location 119, wherein the second parking assist graphic 116 is perceived by the driver properly positioned relative to the selected parking space 92C, location markers 112 for the selected parking space 92C and objects 62 within the environment 64 surrounding the vehicle 10 adjacent to the selected parking space 92C. Further, the system controller 34A continuously, on a periodic cycle, re-calculates the location 119 based on data received from the driver monitoring system 50, the onboard sensors 40a-40n as a position of the head an eyes of the driver move and as the position of the vehicle 10 relative to the selected parking spaces 92C changes throughout the parking maneuver.

When determining the optimal location within the selected parking space 92C, the system controller 34A uses the identified location markers 112 for the selected parking space 92C and identified objects 62 within the environment 64 surrounding the vehicle 10 adjacent the selected parking space 92C.

Figure 6:
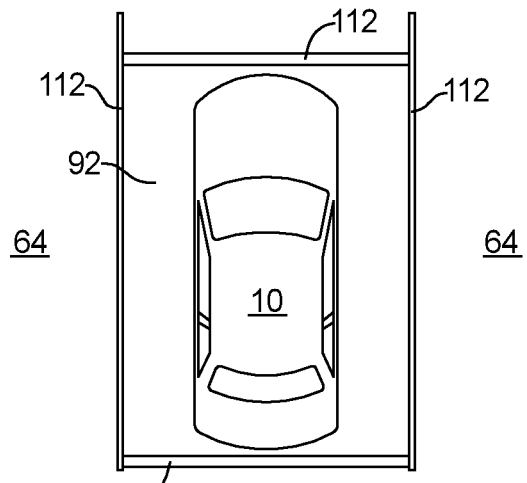
FIG. 6 is a schematic diagram of the vehicle within a selected parking space, wherein the vehicle is centered laterally and longitudinally within the selected parking space.

Referring to FIG. 6, when no objects 62 are detected in the environment 64 surrounding the vehicle 10 adjacent to the selected parking space 92C, the system controller 34A is adapted to display first and second parking assist graphics 114, 116 adapted to guide the driver of the vehicle 10 to a position centered within the selected parking space 92C.

Figure 7:
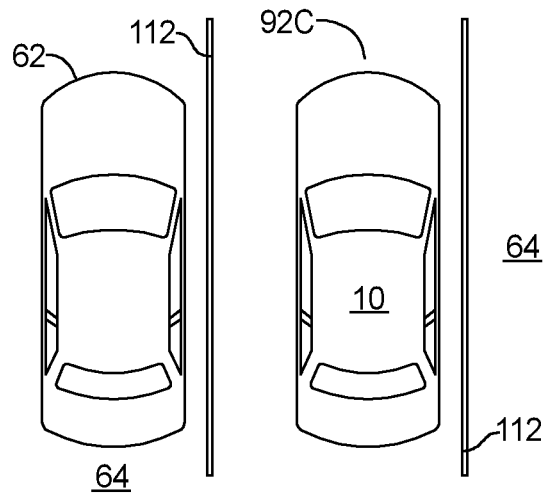
FIG. 7 is a schematic diagram of the vehicle within a selected parking space, wherein the vehicle is off-set from an object adjacent to the selected parking space.

Referring to FIG. 7, when objects 62 are detected in the environment 64 surrounding the vehicle 10 adjacent to the selected parking space 92C, the system 10 is adapted to display first and second parking assist graphics 114, 116 adapted to guide the driver of the vehicle 10 to an offset position within the selected parking space 92C based on the identified objects 62. As shown in FIG. 7, the proximity of an object 62 (as shown another vehicle) immediately adjacent and very close to the selected parking space 92C on the left would make entry and exit from the vehicle 10 by the driver difficult. The system controller 34A, in light of the presence of the object 62 on the left, determines that the optimal position of the vehicle 10 within the selected parking space 92C is a position that is offset from the object 62, rather than centered within the selected parking space 92C. When determining an offset from detected objects 62, the system controller 34A will select an optimal location within the selected parking space 92C that is within identified location markers 112.

Figure 8:
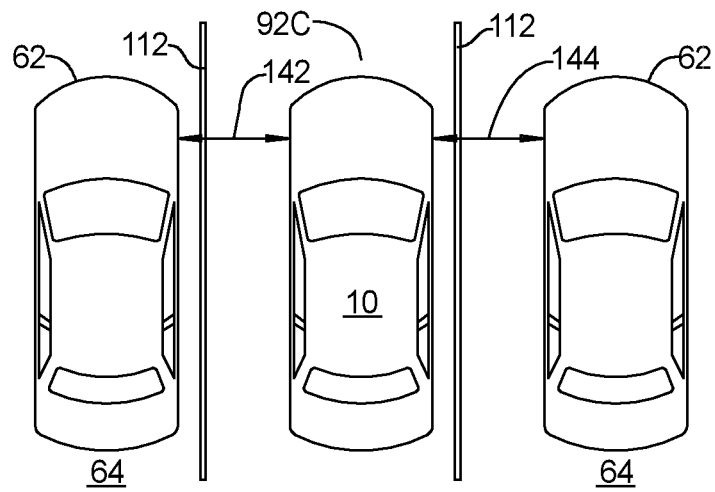
FIG. 8 is a schematic diagram of the vehicle within a selected parking space, wherein the vehicle is centered between objects adjacent to the parking space on both sides.

Referring to FIG. 8, when objects 62 are detected in the environment 64 surrounding the vehicle 10 adjacent to the selected parking space 92C on both sides, the system controller 34A is adapted to display first and second parking assist graphics 114, 116 adapted to guide the driver of the vehicle 10 to a position within the selected parking space 92C and centered between the detected objects 62. The system controller 34A, in light of the presence of other objects/vehicle 62 on either side of the selected parking space 92C, determines that the optimal position of the vehicle 10 within the selected parking space 92C is a position that is centered between the adjacent objects/vehicles 62. The space 142 between the vehicle 10 and the identified object/vehicle 62 on the left, is equal to the space 144 between the vehicle 10 and the identified object/vehicle 62 on the right. This will maximize the space left on either side of the vehicle 10 while still positioning the vehicle 10 within the identified location markers 112 for the selected parking space 92C.

In another exemplary embodiment, the system 11 is adapted to be selectively actuated by the driver and to be actuated automatically when the vehicle 10 begins a parking maneuver. The driver can manually actuate the system 11 when performing a parking maneuver, or the system 11 can run in an automatic mode, wherein, the system 11 runs in the background, without displaying anything, and when the system controller 34A determines that the vehicle 10 is performing a parking maneuver, the system 11 will begin displaying first and second parking assist graphics 114, 116.

The system 11 obtains information of the position of the eyes 66 of the driver of the vehicle 10 from the camera 52 of the driver monitoring system 50 within the vehicle 10. The driver monitoring system 50 uses the camera 52 to identify the facial features of the driver and provides information on the vertical location of the eyes 66 of the driver to the system controller 34A. The projection modules 68, 74 are adapted to project an image upward to the inner surface 56 of the windshield 58, wherein the projected image is reflected to an eye-box. The eye-box is the three-dimensional region within which a driver of the vehicle 10 can see the entire projected image. The look down angle (LDA) is the angle at which the eyes 66 of a driver are oriented relative to the virtual image projected to the eyes 66 of the driver. The virtual image distance (VID) is the distance from the driver's eyes 66 the virtual image is perceived by the driver. To accommodate for driver's of different heights, the LDA and the VID are adjustable to ensure the images projected by the projection modules 68, 74 are perceived by the driver at the proper location relative to the identified parking spaces 92, the selected parking space 92C, and objects 62. Further, the system 11 continuously monitors, with the driver monitoring system 50, the location of the head and eyes 66 of the driver of the vehicle 10, and continuously monitors, with the plurality of sensors 40a-40n, the location of the vehicle 10 relative to the identified parking spaces 92, the selected parking space 92C, and objects 62, and adjusts the displayed position of the first and second information 94, 96 and the first and second parking assist graphics 114, 116 to ensure the first and second information 94, 96 and the first and second parking assist graphics 114, 116 are perceived at the proper location relative to the identified parking spaces 92, the selected parking space 92C and objects 62 as the position of the driver's head and eyes 66 moves and as the position of the vehicle 10 relative to the identified parking spaces 92, the selected parking space 92C and objects 62 changes throughout the parking maneuver.

The system controller 34A is adapted to determine the distance that the vertical location of the driver's eyes 66 varies from a pre-determined nominal vertical position. Based on the distance at which the driver's eyes 66 are either higher or lower than the nominal vertical position, the projection modules 68, 74 can adjust the LDA of the projected first and second information 94, 96 and first and second parking assist graphics 114, 116 to properly position the first and second information 94, 96 and first and second parking assist graphics 114, 116 for the driver of the vehicle 10.

In an exemplary embodiment, the system controller 34A is further adapted to probabilistically calculate, using a machine learning algorithm 122, a probability that the driver will park within each identified parking space 92, and to determine, with the image generator engine 120, the first information 94 and the second information 96 based on the calculated probabilities. The system controller 34A is also adapted to probabilistically calculate, using the machine learning algorithm 122, a preferred location within the selected parking space 92C, and to determine the first parking assist graphic 114 and the second parking assist graphic based on the preferred location.

A database 124 in communication with the system controller 34A is adapted to store data related to past occurrences of parking maneuvers made by the vehicle when the driver was driving the vehicle 10, as well as environmental aspects (weather, temperature, precipitation) and vehicle aspects during such past occurrences. The machine learning algorithm 122 is adapted to predict a probability that the driver will select any one of the identified parking spaces 92 based on real-time data collected by the plurality of onboard sensors 40a-40n, analysis of captured images using computer vision and image recognition techniques and data from past occurrences from the database 124. This will provide data to allow the system controller 34A and the image generator engine 120 to determine appropriate first and second information 94, 96 to help the driver make a decision on where to park, if they desire. Further, if the vehicle is an autonomous vehicle, the system controller 34A can use data from the database 124 and the machine learning algorithm 122 to autonomously select the selected parking space 92C from the identified parking spaces 92, and autonomously park the vehicle 10 therein, when the driver has confirmed their desire to do so.

Once the selected parking space 92C has been chosen, and the parking maneuver has been initiated, the machine learning algorithm 122 is further adapted to probabilistically predict a preferred parking location within the selected parking space 92C based on real-time data collected by the plurality of onboard sensors 40a-40n, analysis of captured images using computer vision and image recognition techniques and data from past occurrences from the database 124. This will provide data to allow the system controller 34A and the image generator engine 120 to determine appropriate first and second parking assist graphics 114, 116 to guide the driver to a desired location within the selected parking space 92C. For example, the system controller 34A may default to parking the vehicle 10 centered laterally and longitudinally within the selected parking space 92C, however, the machine learning algorithm 122, with data from the database 124, may determine, based on past occurrences, that the driver prefers to park off-center, closer to a curb, and further back within the selected parking space 92C, leaving room to exit. Thus, the system controller 34A and the image generator engine 120 will create and display first and second parking assist graphics 114, 116 that guide the driver to a position within the selected parking space 92C that is off-center, closer to the curb, and further back. Further, if the vehicle 10 is an autonomous vehicle, the system controller 34A can use data from the database 124 and the machine learning algorithm 122 to autonomously select a preferred location within the selected parking space 92C, and autonomously park the vehicle 10 therein, when the driver has confirmed their desire to do so.

Various techniques are employed to extract meaningful features from sensor readings and data, including time-series analysis, frequency-domain analysis, and spatial-temporal patterns. The machine learning algorithm 122 includes a machine learning model which may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The machine learning model is trained with data collected from a plurality of different vehicles. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of preferred parking spaces and preferred parking location within selected parking spaces 92C. The machine learning model is trained on a labeled dataset and evaluated using various performance metrics such as accuracy, precision, recall, F1-score, and confusion matrix. The hyperparameters of the models are tuned to achieve optimal results. The machine learning model is further trained on training data and will learn to map input features to the corresponding probabilities.

Data from occurrences of the vehicle and driver identifying parking spaces 92 and choosing selected parking spaces 92C are saved to the database 124 and used to continuously update the machine learning algorithm 122.

Thus, the system controller 34A uses the machine learning algorithm 122 and machine learning techniques to predict a probability that the driver will select an identified parking space 92, and a preferred location within the selected parking space 92C based on analyzing the real-time data collected by the plurality of onboard sensors 40a-40n and via wireless communication with other vehicles and infrastructure systems 58, analysis of captured images using computer vision and image recognition techniques and data from past occurrences from the database 124.

In an exemplary embodiment, when identifying parking spaces within proximity to the vehicle 10, the system controller 34A is further adapted to collect data, via the wireless communication module 36, related to availability, fees, use/timing restrictions, permit requirements and remaining pre-paid time for identified parking spaces 92 and include such data in the first and second information 94, 96. By communicating with remote entities such as parking bureau, government departments, etc. the system controller 34A is able to gather data and can provide first information 94 that includes availability information, such as hours that a parking space 92 may be used, and timing restrictions. The system controller 34A may also collect data that allows the system controller 34A to predict upcoming availability for an identified parking space 92. For example, the system controller 34A may collect data from a publicly accessible parking meter system that indicates the paid time for an identified metered parking space 92 that is currently occupied is about to expire, and can provide first information 94 to the driver letting the driver know this parking space 92 may soon be available. The system controller 34A, via communication with the same parking meter system, may identify an available parking space 92 that still has pre-paid time remaining, and prioritize that identified parking space 92 for the driver. Such data collection by the system controller 34A provides information to the driver that allows the driver to select an identified parking space 92 that is suitable without having to stop at the parking space 92 to visually obtain such information.

Further, when identifying parking spaces 92 within proximity to the vehicle 10, the system controller 34A is further adapted to determine, with computer vision analysis techniques, data related to dimensional characteristics of identified parking spaces 92 and use such data to formulate the first and second information 94, 96 based on dimensional characteristics of the vehicle 10. Using the plurality of sensing devices 40a-40n on the vehicle, specifically cameras, the system controller 34A can analyze images taken of an identified parking space 92 and determine overall dimensions of the identified parking space 92 to determine if the vehicle 10 will fit within the identified parking space 92, and if not, remove that parking space from the identified parking spaces 92 available to the vehicle 10. Further, the system controller, may detect objects 62, such as other vehicles parked in adjacent parking spaces next to, in front of or behind an identified parking space that may crowd the borders of the identified parking space 92, thus making entry/exit into and out of the identified parking space 92 difficult. The system controller 34A can relay this information to the driver in the first and second information 94, 96, and may use this information to prioritize other identified parking spaces 92 for the driver that are easier to utilize.

In another exemplary embodiment, the system controller 34A probabilistically calculates, using the machine learning algorithm 122 and data from the database 124, probability-based data related to availability, fees, use/timing restrictions, permit requirements, remaining pre-paid time and dimensional characteristics for identified parking spaces. The system controller 34A can make predictions based on such probability-based data and use such probability-based data in conjunction with (or in place of, if connectivity is not available) real time data collected via sensors 40a-40n and the wireless communication module 36 to determine first and second information 94, 96 to be provide to the driver.

Figure 9:
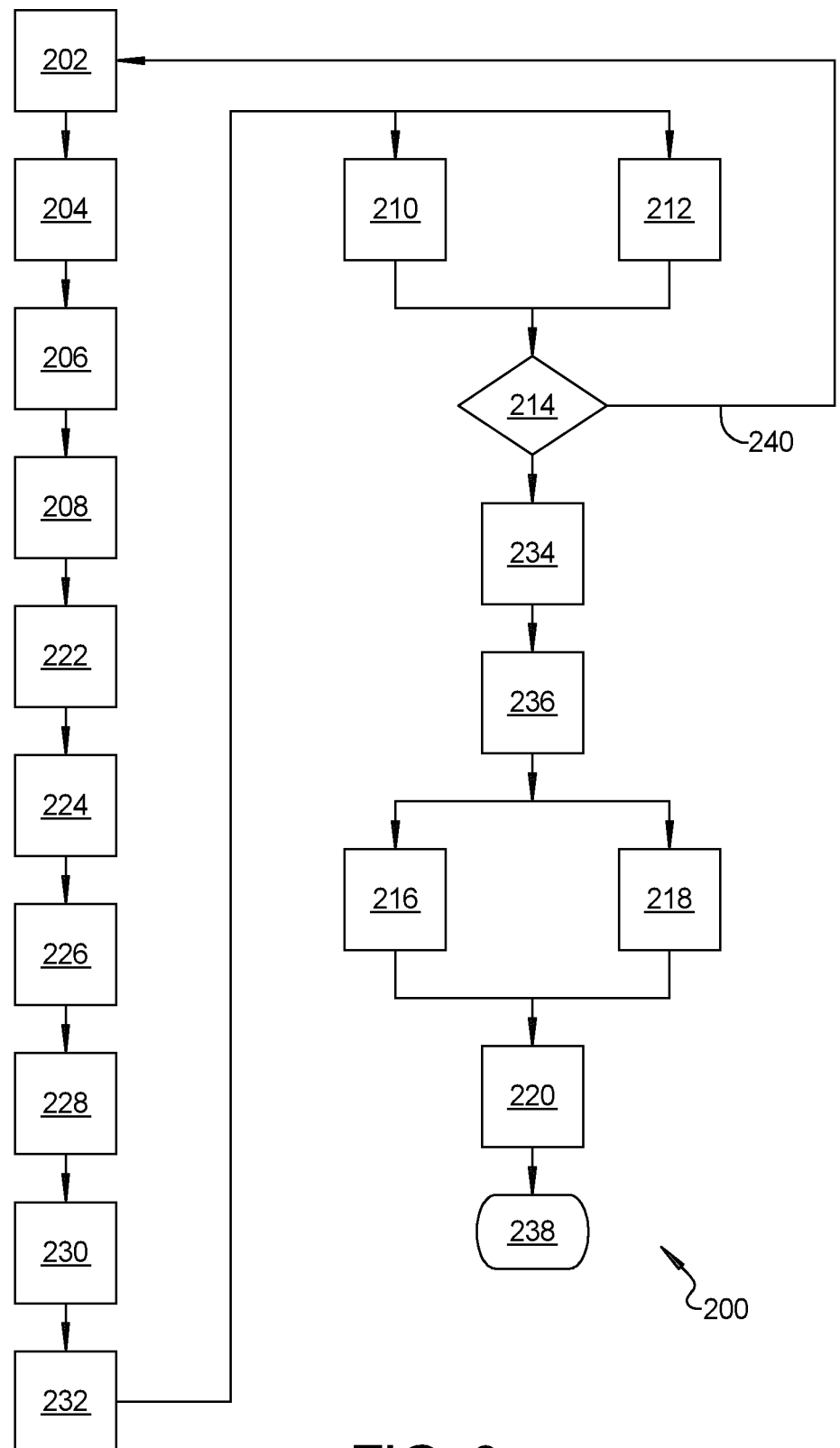
FIG. 9 is a schematic flowchart illustrating a method according to an exemplary embodiment of the present disclosure.

Referring to FIG. 9, a method 200 of providing parking assistance to a driver of a vehicle 10 with a dual head-up display (HUD) system 11 includes, beginning at block 202, detecting, with a plurality of on-board sensors 40a-40n, vehicle driving characteristics, moving to block 204, receiving, with a wireless communication module 36, information from external sources 48, moving to block 206, tracking, with a driver monitoring system 50, a position of the driver's eyes 66, moving to block 208, identifying, with a system controller 34A in electronic communication with the plurality of on-board sensors 40a-40n and the wireless communication module 36, parking spaces 92 within proximity to the vehicle 10, moving to block 210, displaying, with an augmented reality HUD 54, first information 94 related to identified parking spaces 92 in proximity to the vehicle 10, and, moving to block 212, displaying, with a reflective HUD 60, second information 96 related to the identified parking spaces 92 in proximity to the vehicle 10.

In an exemplary embodiment, the displaying, with an augmented reality HUD 54, first information 94 related to identified parking spaces 92 in proximity to the vehicle 10 at block 210 further includes determining, with the system controller 34A in electronic communication with the plurality of on-board sensors 40a-40n and the wireless communication module 36, if an emergency vehicle is approaching the vehicle 10, based on data from the plurality of on-board sensors 40a-40n and data received by the wireless communication module 36, and when an emergency vehicle is approaching the vehicle 10, displaying, with the augmented reality HUD 54, first information 94 including graphics 94C adapted to alert a driver of the vehicle 10 that the emergency vehicle is approaching and to direct the driver of the vehicle 10 to a parking space 92D to allow the emergency vehicle to pass, and the displaying, with a reflective HUD 60, second information 96 related to the identified parking spaces 92 in proximity to the vehicle 10 at block 212 further includes displaying, with the reflective HUD 60, second information 96 including graphics 96A adapted alert a driver of the vehicle 10 that the emergency vehicle is approaching and to direct the driver of the vehicle 10 to a parking space 92D to allow the emergency vehicle to pass.

In an exemplary embodiment, the method 200 further includes, moving to block 214, determining, with the system controller 34A in electronic communication with the plurality of on-board sensors 40a-40n and the wireless communication module 36, if the vehicle 10 is performing a parking maneuver, based on data from the plurality of on-board sensors 40a-40n and data received by the wireless communication module 36, and when the vehicle 10 is performing a parking maneuver into a selected one 92C of the identified parking spaces 92, moving to block 216, displaying, with the augmented reality HUD 54, a first parking assist graphic 114 adapted to provide guidance to a driver of the vehicle 10 while parking the vehicle 10 in the selected parking space 92C, and, moving to block 218, displaying, with the reflective HUD 60, a second parking assist graphic 116 adapted to provide guidance to the driver of the vehicle 10 while parking the vehicle 10 in the selected parking space 92C. If, at block 214, the system controller 34A does not detect that the vehicle 10 is making a parking maneuver, the method 200 reverts back to block 202, as indicated by line 240.

In an exemplary embodiment, the method 200 further includes, prior to displaying the first and second information at blocks 210 and 212, moving to block 222, capturing, with at least one image capturing device 40a-40n in electronic communication with the system controller 34A, images of an environment 64 surrounding the vehicle 10, moving to block 224, detecting, with at least one non-visual sensor 40a-40n in electronic communication with the system controller 34A, objects 62 within the environment 64 surrounding the vehicle 10, moving to block 226, identifying, with the system controller 34A, the at least one image capturing device 40a-40n, and the at least one non-visual sensor 40a-40n, location markers 112 for the identified parking spaces 92 and objects 62 within the environment surrounding the vehicle 64 adjacent to the identified parking spaces 92, and, moving to block 228, determining, with the system controller 34A, a position of the vehicle 10 relative to the identified location markers 112 for the identified parking spaces 92 and objects 62 within the environment surrounding the vehicle 64 adjacent to the identified parking spaces 92.

In an exemplary embodiment, the vehicle windshield 58 includes a first portion 82 that is substantially clear, wherein the displaying, with the augmented reality HUD 54, the first information 94 related to identified parking spaces 92 in proximity to the vehicle 10 at block 210 further includes projecting, with a light source 70 of a projection module 68 of the augmented reality HUD 54, the first information 94 upward to the first portion 82 of the windshield 58, wherein the first information 94 is reflected to the eyes 66 of the driver of the vehicle 10 and the driver of the vehicle 10 perceives the first information 94 within a far image plane 80 overlayed onto the identified parking spaces 92, and, the displaying, with the augmented reality HUD 54, the first parking assist graphic 114 adapted to provide guidance to a driver of the vehicle 10 while parking the vehicle 10 in the selected parking space 92C at block 216 includes projecting, with the light source 70 of the projection module 68 of the augmented reality HUD 54, the first parking assist graphic 114 upward to the first portion 82 of the windshield 58, wherein the first parking assist graphic 114 is reflected to the eyes 66 of the driver of the vehicle 10 and the driver of the vehicle 10 perceives the first parking assist graphic 114 within the far image plane 80 overlayed onto the selected parking space 92C.

In an exemplary embodiment, the displaying, with the augmented reality HUD 54, the first information 94 related to identified parking spaces 92 in proximity to the vehicle 10 at block 210 further includes calculating, with the system controller 34A, a first location 110 within the first portion 82 of the windshield 58 based on data received from the driver monitoring system 50, the at least one image capturing device 40a-40n and the at least on non-visual sensor 40a-40n, and projecting the first information 94 upward to the first location 110, wherein the first information 94 is perceived by the driver properly positioned relative to the identified parking spaces 92. Further, the displaying, with the augmented reality HUD 54, the first parking assist graphic 114 adapted to provide guidance to the driver of the vehicle 10 while parking the vehicle 10 in the selected parking space 92C at block 216 further includes calculating, with the system controller 34A, a second location 118 within the first portion 82 of the windshield 58 based on data received from the driver monitoring system 50, the at least one image capturing device 40a-40n and the at least one non-visual sensor 40a-40n, and projecting the first parking assist graphic 114 upward to the second location 118, wherein the first parking assist graphic 114 is perceived by the driver properly positioned relative to the selected parking space 92C, location markers 112 for the selected parking space 92C and objects 62 within the environment surrounding the vehicle 64 adjacent to the selected parking space 92C.

In another exemplary embodiment, the displaying, with the augmented reality HUD 54, the first information 94 related to identified parking spaces 92 in proximity to the vehicle 10 at block 210 further includes continuously, on a periodic cycle, re-calculating, with the system controller 34A, the first location 110 based on data received from the driver monitoring system 50, the at least one image capturing device 40a-40n and the at least on non-visual sensor 40a-40n as a position of the head an eyes 66 of the driver move and as the position of the vehicle 10 relative to the identified parking spaces 92 changes; and the displaying, with the augmented reality HUD 54, the first parking assist graphic 114 adapted to provide guidance to a driver of the vehicle 10 while parking the vehicle 10 in the selected parking space 92C at block 216 further includes continuously, on a periodic cycle, re-calculating, with the system controller 34A, the second location 118 based on data received from the driver monitoring system 50, the at least one image capturing device 40a-40n and the at least on non-visual sensor 40a-40n as the position of the head an eyes 66 of the driver move and as the position of the vehicle 10 relative to the selected parking space 92C changes throughout the parking maneuver.

In another exemplary embodiment, the vehicle windshield 58 includes a second portion 86 that is substantially opaque, wherein the displaying, with the reflective HUD 60, the second information 96 related to identified parking spaces 92 in proximity to the vehicle 10 at block 212 further includes projecting, with a light source 76 of a projection module 74 of the reflective HUD 60, the second information 96 upward to the second portion 86 of the windshield 58, wherein the second information 96 is reflected to the eyes 66 of the driver of the vehicle 10 and the driver of the vehicle 10 perceives the second information 96 displayed on the second portion 86 of the windshield 58 within a near image plane 84, and the displaying, with the reflective HUD 60, the second parking assist graphic 116 adapted to provide guidance to a driver of the vehicle 10 while parking the vehicle 10 in the selected parking space 92C at block 218 includes projecting, with the light source 76 of the projection module 74 of the reflective HUD 60, the second parking assist graphic 116 upward to the second portion 86 of the windshield 58, wherein the second parking assist graphic 116 is reflected to the eyes 66 of the driver of the vehicle 10 and the driver of the vehicle 10 perceives the second parking assist graphic 116 displayed on the second portion 86 of the windshield 58 within the near image plane 84.

In an exemplary embodiment, the method 200 further includes, prior to displaying, with the augmented reality HUD 54, the first information 94 related to identified parking spaces 92 in proximity to the vehicle 10 at block 210 and displaying, with the reflective HUD 60, the second information 96 related to identified parking spaces 92 in proximity to the vehicle 10 at block 212, moving to block 230, probabilistically calculating, with the system controller 34A, using a machine learning algorithm 122, a probability that the driver will park within each identified parking space 92, and, moving to block 232, determining, with the system controller 34A, the first information 94 and the second information 96 based on the calculated probabilities.

In another exemplary embodiment, the method 200 further includes, prior to the displaying, with the augmented reality HUD 54, the first parking assist graphic 114 adapted to provide guidance to a driver of the vehicle 10 while parking the vehicle 10 in the selected parking space 92C at block 216 and the displaying, with the reflective HUD 60, the second parking assist graphic 116 adapted to provide guidance to a driver of the vehicle 10 while parking the vehicle 10 in the selected parking space 92C at block 218, moving to block 234, probabilistically calculating, with the system controller 34A, using the machine learning algorithm 122, a preferred location within the selected parking space 92C, and, moving to block 236, determining, with the system controller 34A, the first parking assist graphic 114 and the second parking assist graphic 116 based on the preferred location.

In another exemplary embodiment, when no objects 62 are detected in the environment 64 surrounding the vehicle 10 adjacent to the selected parking space 92C, the displaying, with the augmented reality HUD 54, the first parking assist graphic 114 at block 216 further includes, displaying the first parking assist graphic 114, wherein the first parking assist graphic 114 is adapted to guide the driver of the vehicle 10 to a position centered within the selected parking space 92C, and, the displaying, with the reflective HUD 60, the second parking assist graphic 116 at block 218 further includes, displaying the second parking assist graphic 116, wherein the second parking assist graphic 116 is adapted to guide the driver of the vehicle 10 to the position centered within the selected parking space 92C.

In another exemplary embodiment, when objects 62 are detected in the environment 64 surrounding the vehicle 10 adjacent to the selected parking space 92C, the displaying, with the augmented reality HUD 54, the first parking assist graphic 114 at block 216 further includes, displaying the first parking assist graphic 114, wherein the first parking assist graphic 114 is adapted to guide the driver of the vehicle 10 to an offset position within the selected parking space 92C based on the detected objects 62 in the environment 64 surrounding the vehicle 10 adjacent to the selected parking space 92C, and the displaying, with the reflective HUD 60, the second parking assist graphic 116 at block 218 further includes, displaying the second parking assist graphic 116, wherein the second parking assist graphic 116 is adapted to guide the driver of the vehicle 10 to the offset position within the selected parking space 92C based on the detected objects 62 in the environment 64 surrounding the vehicle 10 adjacent to the selected parking space 92C.

In another exemplary embodiment, the system controller 34A is further adapted to continuously identify location markers 112 and objects 62 within the environment 64 surrounding the vehicle 10 adjacent to the selected parking space 92C and determine the position of the vehicle 10 relative to the identified location markers 112 and objects 62 within the environment 64 surrounding the vehicle 10 adjacent to the selected parking space 92C, the method 200 further including, moving to block 220 updating the displayed first parking assist graphic 114 and the displayed second parking assist graphic 116 as the position of the vehicle 10 relative to the identified location markers 112 and objects 62 within the environment 64 surrounding the vehicle 10 adjacent to the selected parking space 92C changes throughout the parking maneuver. Once the parking maneuver is complete, the method 200 ends at block 238.

In an exemplary embodiment, the identifying, with the system controller 34A in electronic communication with the plurality of on-board sensors 40a-40n and the wireless communication module 36, parking spaces 92 within proximity to the vehicle 10 at block 208 further includes collecting data, via the wireless communication module 36, related to availability, fees, use/timing restrictions, permit requirements and remaining pre-paid time for identified parking spaces 92 and including such data in the first and second information 94, 96, determining, with the system controller 34A and computer vision analysis techniques, data related to dimensional characteristics of identified parking spaces 92 and using such data to formulate the first and second information 94, 96 based on dimensional characteristics of the vehicle 10, probabilistically calculating, with the system controller 34A, using the machine learning algorithm 122, probability-based data related to availability, fees, use/timing restrictions, permit requirements, remaining pre-paid time and dimensional characteristics for identified parking spaces 92, and determining, with the system controller 34A, the first information 94 and the second information 96 based on the calculated probability-based data.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing parking assistance to a driver of a vehicle with a dual head-up display (HUD) system, comprising:
   detecting, with a plurality of on-board sensors, vehicle driving characteristics;
   receiving, with a wireless communication module, information from external sources;
   tracking, with a driver monitoring system, a position of the driver's eyes;
   identifying, with a system controller in electronic communication with the plurality of on-board sensors and the wireless communication module, parking spaces within proximity to the vehicle;
   displaying, with an augmented reality HUD, first information related to identified parking spaces in proximity to the vehicle; and
   displaying, with a reflective HUD, second information related to the identified parking spaces in proximity to the vehicle; and
   determining, with the system controller in electronic communication with the plurality of on-board sensors and the wireless communication module, if an emergency vehicle is approaching the vehicle, based on data from the plurality of on-board sensors and data received by the wireless communication module; and
   when an emergency vehicle is approaching the vehicle:
      including, within the first information displayed with the augmented reality HUD, graphics adapted to alert a driver of the vehicle that the emergency vehicle is approaching and to direct the driver of the vehicle to a parking space to allow the emergency vehicle to pass; and
      including, within the second information displayed with the reflective HUD, graphics adapted alert the driver of the vehicle that the emergency vehicle is approaching and to direct the driver of the vehicle to a parking space to allow the emergency vehicle to pass.

2. The method of claim 1, further including:
   determining, with the system controller in electronic communication with the plurality of on-board sensors and the wireless communication module, if the vehicle is performing a parking maneuver, based on data from the plurality of on-board sensors and data received by the wireless communication module; and
   when the vehicle is performing a parking maneuver into a selected one of the identified parking spaces:
   displaying, with the augmented reality HUD, a first parking assist graphic adapted to provide guidance to a driver of the vehicle while parking the vehicle in the selected parking space; and
   displaying, with the reflective HUD, a second parking assist graphic adapted to provide guidance to the driver of the vehicle while parking the vehicle in the selected parking space.

3. The method of claim 2, further including:
   capturing, with at least one image capturing device in electronic communication with the system controller, images of an environment surrounding the vehicle;
   detecting, with at least one non-visual sensor in electronic communication with the system controller, objects within the environment surrounding the vehicle;
   identifying, with the system controller, the at least one image capturing device, and the at least one non-visual sensor, location markers for the identified parking spaces and objects within the environment surrounding the vehicle adjacent to the identified parking spaces; and
   determining, with the system controller, a position of the vehicle relative to the identified location markers for the identified parking spaces and objects within the environment surrounding the vehicle adjacent to the identified parking spaces.

4. The method of claim 3, wherein the vehicle windshield includes a first portion that is substantially clear, wherein:
   the displaying, with the augmented reality HUD, the first information related to identified parking spaces in proximity to the vehicle further includes projecting, with a light source of a projection module of the augmented reality HUD, the first information upward to the first portion of the windshield, wherein the first information is reflected to the eyes of the driver of the vehicle and the driver of the vehicle perceives the first information within a far image plane overlayed onto the identified parking spaces; and
   the displaying, with the augmented reality HUD, the first parking assist graphic adapted to provide guidance to a driver of the vehicle while parking the vehicle in the selected parking space includes projecting, with the light source of the projection module of the augmented reality HUD, the first parking assist graphic upward to the first portion of the windshield, wherein the first parking assist graphic is reflected to the eyes of the driver of the vehicle and the driver of the vehicle perceives the first parking assist graphic within the far image plane overlayed onto the selected parking space.

5. The method of claim 4, wherein:
   the displaying, with the augmented reality HUD, the first information related to identified parking spaces in proximity to the vehicle further includes:
   calculating, with the system controller, a first location within the first portion of the windshield based on data received from the driver monitoring system, the at least one image capturing device and the at least on non-visual sensor; and projecting the first information upward to the first location, wherein the first information is perceived by the driver properly positioned relative to the identified parking spaces; and the displaying, with the augmented reality HUD, the first parking assist graphic adapted to provide guidance to a driver of the vehicle while parking the vehicle in the selected parking space further includes:

calculating, with the system controller, a second location within the first portion of the windshield based on data received from the driver monitoring system, the at least one image capturing device and the at least one non-visual sensor; and projecting the first parking assist graphic upward to the second location, wherein the first parking assist graphic is perceived by the driver properly positioned relative to the selected parking space, location markers for the selected parking space and objects within the environment surrounding the vehicle adjacent to the selected parking space.

6. The method of claim 5, wherein:

the displaying, with the augmented reality HUD, the first information related to identified parking spaces in proximity to the vehicle further includes continuously, on a periodic cycle, re-calculating, with the system controller, the first location based on data received from the driver monitoring system, the at least one image capturing device and the at least on non-visual sensor as a position of the head an eyes of the driver move and as the position of the vehicle relative to the identified parking spaces changes.

7. The method of claim 4, wherein the vehicle windshield includes a second portion that is substantially opaque, wherein:

the displaying, with the reflective HUD, the second information related to identified parking spaces in proximity to the vehicle further includes projecting, with a light source of a projection module of the reflective HUD, the second information upward to the second portion of the windshield, wherein the second information is reflected to the eyes of the driver of the vehicle and the driver of the vehicle perceives the second information displayed on the second portion of the windshield within a near image plane; and the displaying, with the reflective HUD, the second parking assist graphic adapted to provide guidance to a driver of the vehicle while parking the vehicle in the selected parking space includes projecting, with the light source of the projection module of the reflective HUD, the second parking assist graphic upward to the second portion of the windshield, wherein the second parking assist graphic is reflected to the eyes of the driver of the vehicle and the driver of the vehicle perceives the second parking assist graphic displayed on the second portion of the windshield within the near image plane.

8. The method of claim 4 further including:

probabilistically calculating, with the system controller, using a machine learning algorithm, a probability that the driver will park within each identified parking space;

determining, with the system controller, the first information and the second information based on the calculated probabilities;

probabilistically calculating, with the system controller, using the machine learning algorithm, a preferred location within the selected parking space; and determining, with the system controller, the first parking assist graphic and the second parking assist graphic based on the preferred location.

9. The method of claim 4, wherein, the system controller is further adapted to continuously identify location markers and objects within the environment surrounding the vehicle adjacent to the selected parking space and determine the position of the vehicle relative to the identified location markers and objects within the environment surrounding the vehicle adjacent to the selected parking space, the method further including updating the displayed first parking assist graphic and the displayed second parking assist graphic as the position of the vehicle relative to the identified location markers and objects within the environment surrounding the vehicle adjacent to the selected parking space changes.

10. The method of claim 1, wherein the identifying, with the system controller in electronic communication with the plurality of on-board sensors and the wireless communication module, parking spaces within proximity to the vehicle further includes:

collecting data, via the wireless communication module, related to availability, fees, use/timing restrictions, permit requirements and remaining pre-paid time for identified parking spaces and including such data in the first and second information;

determining, with the system controller and computer vision analysis techniques, data related to dimensional characteristics of identified parking spaces and using such data to formulate the first and second information based on dimensional characteristics of the vehicle;

probabilistically calculating, with the system controller, using a machine learning algorithm, probability-based data related to availability, fees, use/timing restrictions, permit requirements, remaining pre-paid time and dimensional characteristics for identified parking spaces; and determining, with the system controller, the first information and the second information based on the calculated probability-based data.

11. A dual head-up display (HUD) system, comprising:

a plurality of on-board sensors adapted to detect and monitor vehicle driving characteristics;

a wireless communication module adapted to receive information from external sources;

a driver monitoring system adapted to track a position of a driver's eyes;

a system controller in electronic communication with the plurality of on-board sensors, the driver monitoring system and the wireless communication module, and adapted to:

identify parking spaces within proximity to the vehicle;

display, with an augmented reality HUD, first information related to identified parking spaces in proximity to the vehicle;

display, with a reflective HUD, second information related to the identified parking spaces in proximity to the vehicle;

determine if an emergency vehicle is approaching the vehicle, based on data from the plurality of on-board sensors and data received by the wireless communication module; and when an emergency vehicle is approaching the vehicle:

display, with the augmented reality HUD, first information including graphics adapted to alert a driver of the vehicle that the emergency vehicle is approaching and to direct the driver to a parking space to allow the emergency vehicle to pass; and display, with the reflective HUD, second information including graphics adapted alert a driver of the vehicle that the emergency vehicle is approaching and to direct the driver to a parking space to allow the emergency vehicle to pass; and
determine, if the vehicle is performing a parking maneuver, based on data from the plurality of on-board sensors and data received by the wireless communication module; and
when the vehicle is performing a parking maneuver into a selected one of the identified parking spaces:
display, with the augmented reality HUD, a first parking assist graphic adapted to provide guidance to a driver of the vehicle while parking the vehicle in the selected parking space; and
display, with the reflective HUD, a second parking assist graphic adapted to provide guidance to the driver of the vehicle while parking the vehicle in the selected parking space.

12. The system of claim 11, wherein the system controller is further adapted to:
capture, with at least one image capturing device in electronic communication with the system controller, images of an environment surrounding the vehicle;
detect, with at least one non-visual sensor in electronic communication with the system controller, objects within the environment surrounding the vehicle;
identify location markers for the identified parking spaces and objects within the environment surrounding the vehicle adjacent to the identified parking spaces; and
determine a position of the vehicle relative to the identified location markers for the identified parking spaces and objects within the environment surrounding the vehicle adjacent to the identified parking spaces.

13. The system of claim 12, wherein the vehicle windshield includes a first portion that is substantially clear, and the augmented reality HUD is adapted to:
project, with a light source of a projection module the first information upward to the first portion of the windshield, wherein the first information is reflected to the eyes of the driver of the vehicle and the driver of the vehicle perceives the first information within a far image plane overlayed onto the identified parking spaces; and
project, with the light source of the projection module the first parking assist graphic upward to the first portion of the windshield, wherein the first parking assist graphic is reflected to the eyes of the driver of the vehicle and the driver of the vehicle perceives the first parking assist graphic within the far image plane overlayed onto the selected parking space.

14. The system of claim 13, wherein:
when displaying, with the augmented reality HUD, the first information related to identified parking spaces in proximity to the vehicle, the system controller is further adapted to:
calculate a first location within the first portion of the windshield based on data received from the driver monitoring system, the at least one image capturing device and the at least on non-visual sensor; and
project the first information upward to the first location, wherein the first information is perceived by the driver properly positioned relative to the identified parking spaces;
continuously, on a periodic cycle, re-calculate the first location based on data received from the driver monitoring system, the at least one image capturing device and the at least on non-visual sensor as the position of the head an eyes of the driver move and as the position of the vehicle relative to the identified parking spaces changes; and
when displaying, with the augmented reality HUD, the first parking assist graphic adapted to provide guidance to the driver of the vehicle while parking the vehicle in the selected parking space, the system controller is further adapted to:
calculate a second location within the first portion of the windshield based on data received from the driver monitoring system, the at least one image capturing device and the at least one non-visual sensor;
project the first parking assist graphic upward to the second location, wherein the first parking assist graphic is perceived by the driver properly positioned relative to the selected parking space, location markers for the selected parking space and objects within the environment surrounding the vehicle adjacent to the selected parking space; and
continuously, on a periodic cycle, re-calculate the second location based on data received from the driver monitoring system, the at least one image capturing device and the at least on non-visual sensor as the position of the head an eyes of the driver move and as the position of the vehicle relative to the selected parking space changes throughout the parking maneuver.

15. The system of claim 14, wherein the vehicle windshield includes a second portion that is substantially opaque, and the reflective HUD is adapted to:
project, with a light source of a projection module of the reflective HUD, the second information upward to the second portion of the windshield, wherein the second information is reflected to the eyes of the driver of the vehicle and the driver of the vehicle perceives the second information displayed on the second portion of the windshield within a near image plane; and
project, with the light source of the projection module of the reflective HUD, the second parking assist graphic upward to the second portion of the windshield, wherein the second parking assist graphic is reflected to the eyes of the driver of the vehicle and the driver of the vehicle perceives the second parking assist graphic displayed on the second portion of the windshield within the near image plane.

16. The system of claim 15, wherein the system controller is further adapted to:
probabilistically calculate, using a machine learning algorithm, a probability that the driver will park within each identified parking space;
determine the first information and the second information based on the calculated probabilities;
probabilistically calculate, using the machine learning algorithm, a preferred location within the selected parking space; and
determine the first parking assist graphic and the second parking assist graphic based on the preferred location.

17. The system of claim 16, wherein, when identifying parking spaces within proximity to the vehicle, the system controller is further adapted to:
collect data, via the wireless communication module, related to availability, fees, use/timing restrictions, permit requirements and remaining pre-paid time for identified parking spaces and include such data in the first and second information;
determine, with computer vision analysis techniques, data related to dimensional characteristics of identified parking spaces and use such data to formulate the first and second information based on dimensional characteristics of the vehicle;

probabilistically calculate, using a machine learning algorithm, probability-based data related to availability, fees, use/timing restrictions, permit requirements, remaining pre-paid time and dimensional characteristics for identified parking spaces; and determine the first information and the second information based on the calculated probability-based data.

18. The system of claim 17, wherein, the system controller is further adapted to:

continuously identify location markers and objects within the environment surrounding the vehicle adjacent to the selected parking space;

determine the position of the vehicle relative to the identified location markers and objects within the environment surrounding the vehicle adjacent to the selected parking space; and update the displayed first parking assist graphic and the displayed second parking assist graphic as the position of the vehicle relative to the identified location markers and objects within the environment surrounding the vehicle adjacent to the selected parking space changes.

19. A vehicle having a dual head-up display (HUD) system, comprising:

a plurality of on-board sensors adapted to detect and monitor vehicle driving characteristics;

a wireless communication module adapted to receive information from external sources;

a driver monitoring system adapted to track a position of a driver's eyes;

a system controller in electronic communication with the plurality of on-board sensors, the driver monitoring system and the wireless communication module, and adapted to:

identify parking spaces within proximity to the vehicle;

capture, with at least one image capturing device in electronic communication with the system controller, images of an environment surrounding the vehicle;

detect, with at least one non-visual sensor in electronic communication with the system controller, objects within the environment surrounding the vehicle;

identify location markers for the identified parking spaces and objects within the environment surrounding the vehicle adjacent to the identified parking spaces; and determine a position of the vehicle relative to the identified location markers for the identified parking spaces and objects within the environment surrounding the vehicle adjacent to the identified parking spaces;

project, with a light source of a projection module of an augmented reality HUD, first information related to the identified parking spaces upward to a first portion of the windshield that is substantially clear, wherein the first information is reflected to the eyes of the driver of the vehicle and the driver of the vehicle perceives the first information within a far image plane overlayed onto the identified parking spaces;

project, with a light source of a projection module of a reflective HUD, second information related to the identified parking spaces in proximity to the vehicle upward to a second portion of the windshield that is substantially opaque, wherein the second information is reflected to the eyes of the driver of the vehicle and the driver of the vehicle perceives the second information displayed on the second portion of the windshield within a near image plane;

determine, if the vehicle is performing a parking maneuver, based on data from the plurality of on-board sensors and data received by the wireless communication module; and when the vehicle is performing a parking maneuver into a selected one of the identified parking spaces:

project, with the light source of the projection module of the augmented reality HUD, a first parking assist graphic adapted to provide guidance to a driver of the vehicle while parking the vehicle in the selected parking space upward to the first portion of the windshield, wherein the first parking assist graphic is reflected to the eyes of the driver of the vehicle and the driver of the vehicle perceives the first parking assist graphic within the far image plane overlayed onto the selected parking space; and project, with the light source of the projection module of the reflective HUD, a second parking assist graphic adapted to provide guidance to the driver of the vehicle while parking the vehicle in the selected parking space upward to the second portion of the windshield, wherein the second parking assist graphic is reflected to the eyes of the driver of the vehicle and the driver of the vehicle perceives the second parking assist graphic displayed on the second portion of the windshield within the near image plane;

the system controller further adapted to:

probabilistically calculate, using a machine learning algorithm, a probability that the driver will park within each identified parking space;

determine the first information and the second information based on the calculated probabilities;

probabilistically calculate, using the machine learning algorithm, a preferred location within the selected parking space; and determine the first parking assist graphic and the second parking assist graphic based on the preferred location.

20. The method of claim 6, wherein the displaying, with the augmented reality HUD, the first parking assist graphic adapted to provide guidance to a driver of the vehicle while parking the vehicle in the selected parking space further includes continuously, on a periodic cycle, re-calculating, with the system controller, the second location based on data received from the driver monitoring system, the at least one image capturing device and the at least on non-visual sensor as the position of the head an eyes of the driver move and as the position of the vehicle relative to the selected parking space changes throughout the parking maneuver.

* * * * *